(12) United States Patent  
Lin et al.

(10) Patent No.: US 11,790,699 B2
(45) Date of Patent: Oct. 17, 2023

(54) SYSTEMS AND METHODS FOR TRAFFIC VIOLATION DETECTION

(71) Applicant: ZHEJIANG DAHUA TECHNOLOGY CO., LTD., Zhejiang (CN)

(72) Inventors: Jun Lin, Hangzhou (CN); Yayun Wang, Hangzhou (CN)

(73) Assignee: ZHEJIANG DAHUA TECHNOLOGY CO., LTD., Hangzhou (CN)

(*) Notice: Subject to any disclaimer, the term of this patent is extended or adjusted under 35 U.S.C. 154(b) by 0 days.

(21) Appl. No.: 17/647,976

(22) Filed: Jan. 13, 2022

(65) Prior Publication Data
US 2022/0139217 A1 May 5, 2022

Related U.S. Application Data

(63) Continuation of application No. PCT/CN2019/126617, filed on Dec. 19, 2019.

(30) Foreign Application Priority Data

Aug. 8, 2019 (CN) .......................... 201910731311.8

(51) Int. Cl.
*G06V 40/20* (2022.01)
*G06V 40/16* (2022.01)
(Continued)

(52) U.S. Cl.
CPC ............ *G06V 40/25* (2022.01); *G06V 10/764* (2022.01); *G06V 10/82* (2022.01); *G06V 20/52* (2022.01);
(Continued)

(58) Field of Classification Search
None
See application file for complete search history.

(56) References Cited

U.S. PATENT DOCUMENTS 8,825,350 B1* 9/2014 Robinson ............... G08G 1/042  
340/916  
9,672,734 B1* 6/2017 Ratnasingam .......... H04W 4/44  
(Continued)

FOREIGN PATENT DOCUMENTS

CN 103183027 A 7/2013
CN 103198659 A 7/2013
(Continued)

OTHER PUBLICATIONS

The Extended European Search Report in European Application No. 19940751.1 dated Jul. 4, 2022, 8 pages.
(Continued)

*Primary Examiner* — Fekadeselassie Girma
(74) *Attorney, Agent, or Firm* — METIS IP LLC

(57) ABSTRACT

The present disclosure provides a system and method for traffic violation detection. The system may determine a target object which should be given precedence with respect to a vehicle from one or more moving objects by performing an angle correction on the one or more moving objects, wherein the one or more moving objects are objects moving in a predetermined region. When it is determined that a moving direction of the target object is a moving direction towards middle of a road and a target vehicle passing through the predetermined region is not courteous to the target object, the system may mark a state of the target vehicle as a violation state.

20 Claims, 15 Drawing Sheets

(51) Int. Cl.
  *G06V 20/54* (2022.01)
  *G06V 20/62* (2022.01)
  *G08G 1/01* (2006.01)
  *G08G 1/017* (2006.01)
  *G08G 1/052* (2006.01)
  *G08G 1/056* (2006.01)
  *G06V 10/764* (2022.01)
  *G06V 10/82* (2022.01)
  *G06V 20/52* (2022.01)
  *G06V 40/10* (2022.01)

(52) U.S. Cl.
  CPC ............ *G06V 20/54* (2022.01); *G06V 20/625* (2022.01); *G06V 40/103* (2022.01); *G06V 40/172* (2022.01); *G08G 1/0133* (2013.01); *G08G 1/0141* (2013.01); *G08G 1/0145* (2013.01); *G08G 1/0175* (2013.01); *G08G 1/052* (2013.01); *G08G 1/056* (2013.01)

(56) References Cited

U.S. PATENT DOCUMENTS

| | | | | |
|---|---|---|---|---|
| 10,217,354 | B1* | 2/2019 | Burke | .................... G07C 5/008 |
| 10,475,338 | B1* | 11/2019 | Noel | ........................ G08G 1/04 |
| 2014/0314275 | A1* | 10/2014 | Edmondson | ........... G06V 20/54 |
| | | | | 382/103 |
| 2016/0148058 | A1* | 5/2016 | Bulan | .................... G06V 20/54 |
| | | | | 382/103 |
| 2020/0111363 | A1* | 4/2020 | Maeda | ................. G08G 1/0145 |

FOREIGN PATENT DOCUMENTS

| | | | | |
|---|---|---|---|---|
| CN | 104361747 | A | 2/2015 | |
| CN | 105448094 | A | 3/2016 | |
| CN | 107161147 | A | 9/2017 | |
| CN | 107248291 | A | 10/2017 | |
| CN | 109035795 | A | 12/2018 | |
| CN | 109741608 | A | 5/2019 | |
| DE | 102007014012 | A1* | 10/2007 | ......... G06K 9/00369 |
| JP | 2005283531 | A | 10/2005 | |
| WO | 2021022759 | A1 | 2/2021 | |

OTHER PUBLICATIONS

International Search Report in PCT/CN2019/126617 dated May 12, 2020, 4 pages.
Written Opinion in PCT/CN2019/126617 dated May 12, 2020, 5 pages.
First Office Action in Chinese Application No. 201910731311.8 dated Sep. 17, 2021, 11 pages.

* cited by examiner

400

```
┌─────────────────────────────────────────┐
│ Determining a courtesy target of a plurality of walking │
│ targets that requires to be given way by a vehicle by  │         410
│ correcting a walking angle of each of the plurality of │ ─────
│ walking targets, wherein each of the plurality of walking │
│ targets being a target that walks within a predetermined │
│                    region                │
└─────────────────────────────────────────┘
                    │
                    ▼
┌─────────────────────────────────────────┐
│ Marking a state of a target vehicle as a violation state │
│  when it is determined that a walking direction of the  │
│  courtesy target is toward the middle of a road and the │         420
│ target vehicle passes through the predetermined region │ ─────
│       without giving way to the courtesy target        │
└─────────────────────────────────────────┘
```

FIG. 4

SYSTEMS AND METHODS FOR TRAFFIC VIOLATION DETECTION

CROSS-REFERENCE TO RELATED APPLICATIONS

This application is a continuation of International Application No. PCT/CN2019/126617, filed on Dec. 19, 2019, which claims priority of Chinese Patent Application No. 201910731311.8, filed on Aug. 8, 2019, the contents of each of which are hereby incorporated by reference in its entirety.

TECHNICAL FIELD

The disclosure generally relates to traffic monitoring technology, and more particularly, relates to systems and methods for detecting a traffic violation behavior.

BACKGROUND

With the rapid development of the economy, vehicles have become a popular means of transportation. At present, a large number of traffic accidents have been caused by uncourteous driving behaviors, such as not stopping for moving objects (e.g., pedestrians, non-motorized vehicles) on crosswalks. Traffic management departments have established rules to prevent such uncourteous driving behaviors. Commonly, the behavior of a moving object (e.g., a vehicle, a pedestrian) at or near a crosswalk may be monitored by a monitoring device. Uncourteous driving behavior of drivers may be detected according to images captured by the monitoring device. However, the location and orientation of the monitoring device may be varied. The angles of a lane and a zebra crossing in an image captured by the monitoring device may vary in different installation scenarios, resulting in an inaccurate determination of a moving direction of the moving object. In addition, a wandering pedestrian may be wrongly determined as a pedestrian who wants to cross a crosswalk in detecting uncourteous driving behaviors, which may result in an inaccurate detection result. Therefore, it is desired to provide systems and methods for detecting traffic violation behavior, thereby improving the detection efficiency and/or accuracy.

SUMMARY

According to a first aspect of the present disclosure, a method is provided. The method may be implemented on at least one computing device, each of which may include at least one processor and a storage device. The method may include determining a target object which should be given precedence with respect to a vehicle from one or more moving objects by performing an angle correction on the one or more moving objects, the one or more moving objects may be objects moving in a predetermined region; and when it is determined that a moving direction of the target object is a moving direction towards a middle of a road and a target vehicle passing through the predetermined region is not courteous to the target object, marking a state of the target vehicle as a violation state.

In some embodiments, the determining a target object which should be given precedence with respect to a vehicle from one or more moving objects by performing an angle correction on the one or more moving objects may include determining an average angle between at least two lane lines captured by a monitoring device and a horizontal direction; determining a displacement of a first moving object included in the one or more moving objects based on two image frames captured by the monitoring device; and determining the first moving object as the target object which should be given precedence with respect to a vehicle when it is determined that the average angle and the displacement satisfy the following formulas:

$$|\alpha - \beta - \arctan(\Delta y / \Delta x)| \leq \lambda$$

$$|\Delta x \times \cos(\alpha - \beta)| \geq s$$

where $\lambda$ refers to a threshold angle, s refers to a threshold distance, $\alpha$ refers to the average angle, $\beta$ refers to a constant value, $\Delta x$ refers to a first displacement in the horizontal direction included in the displacement, and $\Delta y$ refers to a second displacement in the vertical direction included in the displacement.

In some embodiments, the determining that a moving direction of the target object is a moving direction towards a middle of a road may include determining a first image frame and a second image frame sequentially captured by the monitoring device, wherein the second image frame is an image captured at a time point which is after a predetermined time interval from a time point when the first image frame is captured, and the first image frame and the second image frame are images including the target object; and determining that the moving direction of the target object is towards the middle of the road based on an orientation of a first position relative to a second position, wherein the first position is a location of the target object included in the first image frame and the second location is a location of the target object included in the second image frame.

In some embodiments, before determining a target object which should be given precedence with respect to a vehicle from one or more moving objects by performing an angle correction on the one or more moving objects, the method may further include controlling a signal lamp to perform a prompting operation after determining that the one or more moving objects are in the predetermined region.

In some embodiments, after determining that the moving direction of the target object is a moving direction towards the middle of the road and before determining that the target vehicle passing through the predetermined region is not courteous to the target object, the method may further include establishing a target binding relationship between the target object and the target vehicle and assigning a target ID to the target binding relationship. In some embodiments, the marking the state of the target vehicle as the violation state may include marking the state of the target vehicle corresponding to the target ID as the violation state.

In some embodiments, after marking a state of a target vehicle as a violation state, the method may further include determining that a door of the target vehicle captured by the monitoring device is in an open state and the target object disappears after a predetermined period from a time point when the door is determined in the open state; and canceling the violation state of the target vehicle.

In some embodiments, the method may further include performing at least one of operations on the target vehicle, the operations including a license plate recognition, a speed detection, a window detection, or a face recognition; and recording a processing result.

According to a second aspect of the present disclosure, a device is provided. The device may include a determination module configured to determine a target object which should be given precedence with respect to a vehicle from one or more moving objects by performing an angle correction on the one or more moving objects, wherein the one or more moving objects are objects moving in a predetermined region; and a marking module configured to mark a state of the target vehicle as a violation state when it is determined that a moving direction of the target object is a moving direction towards a middle of a road and a target vehicle passing through the predetermined region is not courteous to the target object.

According to a third aspect of the present disclosure, a non-transitory computer readable medium storing at least one set of instructions is provided. When executed by at least one processor, the at least one set of instructions may direct the at least one processor to perform a method. The method may include determining a target object which should be given precedence with respect to a vehicle from one or more moving objects by performing an angle correction on the one or more moving objects, wherein the one or more moving objects are objects moving in a predetermined region; and when it is determined that a moving direction of the target object is a moving direction towards a middle of a road and a target vehicle passing through the predetermined region is not courteous to the target object, marking a state of the target vehicle as a violation state.

According to a fourth aspect of the present disclosure, an electronic device is provided. The electronic device may include at least one storage device storing executable instructions, and at least one processor in communication with the at least one storage device. When executing the executable instructions, the at least one processor may be directed to cause the system to perform operations including determining a target object which should be given precedence with respect to a vehicle from one or more moving objects by performing an angle correction on the one or more moving objects, wherein the one or more moving objects are objects moving in a predetermined region; and when it is determined that a moving direction of the target object is a moving direction towards a middle of a road and a target vehicle passing through the predetermined region is not courteous to the target object, marking a state of the target vehicle as a violation state.

According to a fifth aspect of the present disclosure, a system is provided. The system may include at least one storage device storing executable instructions, and at least one processor in communication with the at least one storage device. When executing the executable instructions, the at least one processor may cause the system to perform one or more of the following operations. The system may identify one or more candidate objects within a predetermined region associated with a crosswalk at a road. For each of the one or more candidate objects, the system may further determine a moving direction of the candidate object with respect to the road. The system may further determine one or more target objects from the one or more candidate objects based on one or more moving directions corresponding to the one or more candidate objects. The system may further identify one or more vehicles within a predetermined range of the crosswalk. For each of the one or more vehicles, the system may further obtain, from a camera, one or more images associated with the vehicle at one or more predetermined positions. The system may further determine whether the vehicle has a traffic violation behavior associated with the one or more target objects based on the one or more images.

In some embodiments, to determine the moving direction of the candidate object with respect to the road, the system may perform one or more of the following operations. The system may determine an initial position of the candidate object within the predetermined region based on an initial image captured at an initial time point. The system may further determine whether the initial position of the candidate object is in the vicinity of an outer edge of the predetermined region. In response to a determination that the initial position is in the vicinity of the outer edge of the predetermined region, the system may determine a plurality of intermediate positions of the candidate object within the predetermined region based on a plurality of sequential images associated with the candidate object. The plurality of sequential images may be sequentially captured at a plurality of intermediate time points immediately after the initial time point. The system may determine a plurality of intermediate moving directions of the candidate object based on a plurality of positions including the initial position and the plurality of intermediate positions. Each of the plurality of intermediate moving directions may correspond to two adjacent positions of the plurality of positions. The system may determine the moving direction of the candidate object based at least in part on the plurality of intermediate moving directions.

In some embodiments, to determine the moving direction of the candidate object based at least in part on the plurality of intermediate moving directions, the system may perform one or more of the following operations. The system may select candidate intermediate moving directions satisfying a predetermined condition from the plurality of intermediate moving directions. The system may determine the moving direction of the candidate object based on the candidate intermediate moving directions.

In some embodiments, to select the candidate intermediate moving directions satisfying the predetermined condition from the plurality of intermediate moving directions, the system may perform one or more of the following operations. The system may identify one or more lane lines associated with the crosswalk. The system may determine an average angle between the one or more lane lines and a horizontal direction. For each of the plurality of intermediate moving positions, the system may determine an angle between the intermediate moving direction and the horizontal direction. The system may determine a reference angle based on the average angle and the angle between the intermediate moving direction and the horizontal direction. The system may determine a moving distance connecting the two adjacent positions corresponding to the intermediate moving direction. The system may determine whether the reference angle is less than a threshold angle and whether the moving distance is larger than a threshold distance. In response to a determination that the reference angle is less than the threshold angle and the moving distance is larger than the threshold distance, the system may determine the intermediate moving direction as a candidate intermediate moving direction.

In some embodiments, to determine the moving direction of the candidate object based on the candidate intermediate moving directions, the system may determine an average moving direction of the candidate intermediate moving directions as the moving direction of the candidate object.

In some embodiments, to determine the one or more target objects from the one or more candidate objects based the on one or more moving directions corresponding to the one or more candidate objects, for each of the one or more candidate objects, the system may determine whether the moving direction is a direction away from the road or a direction crossing the road. In response to a determination that the moving direction is the direction crossing the road, the system may designate the candidate object as a target object.

In some embodiments, the one or more predetermined positions may include a first line within a first predetermined distance range of a side of a crosswalk area, a second line within the crosswalk area, and a third line within a third predetermined distance range of the other side of the crosswalk area. To determine whether the vehicle has a traffic violation behavior associated with the one or more target objects based on the one or more images, the system may determine whether three images associated with the vehicle at the first line, the second line, and the third line are captured within a first predetermined time period. In response to a determination that three images associated with the vehicle at the first line, the second line, and the third line are captured within the first predetermined time period, the system may determine that the vehicle has a traffic violation behavior associated with the one or more target objects.

In some embodiments, to determine whether the vehicle has a traffic violation behavior associated with the one or more target objects based on the one or more images, the system may determine whether a door of the vehicle is open and whether at least one of the one or more target objects disappears in a second predetermined time period based on the one or more images associated with the vehicle. In response to a determination that the door of the vehicle is open and the at least one of the one or more target objects disappears, the system may determine that the vehicle does not have a traffic violation behavior associated with the one or more target objects.

In some embodiments, in response to a determination that the vehicle has a traffic violation behavior associated with the one or more target objects, the system may detect at least one of a license plate, a speed, a face, or a driving behavior associated with the vehicle.

In some embodiments, the system may further cause a signal device to generate a reminder signal in response to determining the one or more target objects.

In some embodiments, in response to a determination that the vehicle has a traffic violation behavior associated with the one or more target objects, the system may transmit information associated with the traffic violation behavior to a target device.

In some embodiments, the target device may include at least one of a traffic management department, a data center, an alarm center or a terminal device associated with the vehicle.

According to a sixth aspect of the present disclosure, a method is provided. The method may be implemented on at least one computing device, each of which may include at least one processor and a storage device. The method may include identifying one or more candidate objects within a predetermined region associated with a crosswalk at a road; for each of the one or more candidate objects, determining a moving direction of the candidate object with respect to the road; determining one or more target objects from the one or more candidate objects based on one or more moving directions corresponding to the one or more candidate objects; identifying one or more vehicles within a predetermined range of the crosswalk; and for each of the one or more vehicles, obtaining, from a camera, one or more images associated with the vehicle at one or more predetermined positions; and determining whether the vehicle has a traffic violation behavior associated with the one or more target objects based on the one or more images.

According to a seventh aspect of the present disclosure, a system is provided. The system implemented on a computing device may have a processor, a storage medium, and a communication platform connected to a network. The system may include an identification module configured to identify one or more candidate objects within a predetermined region associated with a crosswalk at a road and one or more vehicles within a predetermined range of the crosswalk. The system may further include a moving direction determination module configured to determine a moving direction of each of the one or more candidate objects with respect to the road. The system may further include a target object determination module configured to determine one or more target objects from the one or more candidate objects based on one or more moving directions corresponding to the one or more candidate objects. The system may further include The system may further include a traffic violation behavior determination module configured to obtain, form a camera, one or more images associated with each of the one or more vehicles at one or more predetermined positions, and determine whether the vehicle has a traffic violation behavior associated with the one or more target objects based on the one or more images.

According to an eighth aspect of the present disclosure, a non-transitory computer readable medium storing at least one set of instructions is provided. When executed by at least one processor, the at least one set of instructions may direct the at least one processor to perform a method. The method may include identifying one or more candidate objects within a predetermined region associated with a crosswalk at a road; for each of the one or more candidate objects, determining a moving direction of the candidate object with respect to the road; determining one or more target objects from the one or more candidate objects based on one or more moving directions corresponding to the one or more candidate objects; identifying one or more vehicles within a predetermined range of the crosswalk; and for each of the one or more vehicles, obtaining, from a camera, one or more images associated with the vehicle at one or more predetermined positions; and determining whether the vehicle has a traffic violation behavior associated with the one or more target objects based on the one or more images.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 4 is a flowchart illustrating an exemplary process for marking a violation state of a vehicle according to some embodiments of the present disclosure;

DETAILED DESCRIPTION

Figure 1:
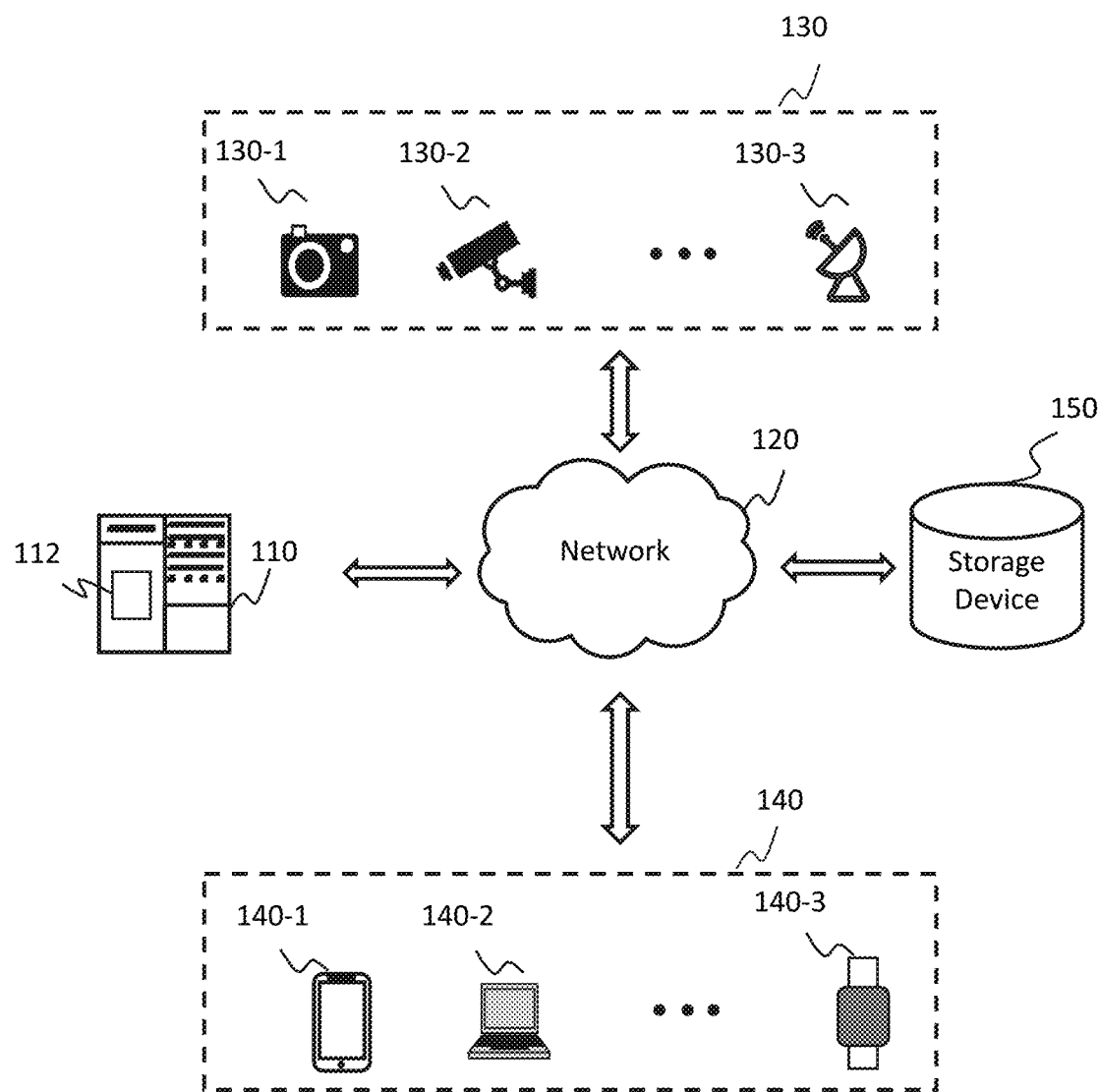
FIG. 1 is a schematic diagram illustrating an exemplary traffic monitoring system according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or any other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an erasable programmable read-only memory (EPROM). It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that the term "system," "engine," "unit," "module," and/or "block" used herein are one method to distinguish different components, elements, parts, sections or assembly of different levels in ascending order. However, the terms may be displaced by another expression if they achieve the same purpose.

It should also be understood that terms such as "top," "bottom," "upper," "lower," "vertical," "lateral," "above," "below," "upward(s)," "downward(s)," "left-hand side," "right-hand side," "horizontal," and other such spatial reference terms are used in a relative sense to describe the positions or orientations of certain surfaces/parts/components of a vehicle with respect to other such features of the vehicle when the vehicle is in a normal operating position and may change if the position or orientation of the vehicle changes.

It will be understood that, although the terms "first," "second," "third," etc., may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present disclosure.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in an inverted order, or simultaneously. Moreover, one or more other operations may be added to the flowcharts. One or more operations may be removed from the flowcharts.

Provided herein are systems and methods for determining whether a vehicle has a traffic violation behavior. The systems and methods may identify one or more candidate objects within a predetermined region associated with a crosswalk at a road. For each of the one or more candidate objects, the systems and methods may determine a moving direction of the candidate object with respect to the road. The systems and methods may further determine one or more target objects from the one or more candidate objects based on one or more moving directions corresponding to the one or more candidate objects. The systems and methods may also identify one or more vehicles within a predetermined range of the crosswalk. For each of the one or more vehicles, the systems and methods may obtain, from a camera, one or more images associated with the vehicle at one or more predetermined positions. The systems and methods may determine whether the vehicle has a traffic violation behavior associated with the one or more target objects based on the one or more images.

According to some embodiments of the present disclosure, in determining a moving direction of a candidate object, an angle correction (e.g., as described in FIG. 4) may be performed to improve a determination accuracy of the moving direction. In addition, the moving direction of the candidate object may be determined based on a plurality of intermediate positions of the candidate object during a time period. This may be used to identify a candidate object that is wandering on the road and avoid misjudgment caused by such a candidate object.

Additionally or alternatively, in some embodiments, the systems and methods may determine whether a door of the vehicle is open and whether at least one of the one or more target objects disappears in a predetermined time period based on the one or more images associated with the vehicle. If the door of the vehicle is open and the at least one of the one or more target objects disappears, the systems and methods may determine that the at least one of the one or more target objects gets into the vehicle, and the vehicle does not have the traffic violation behavior associated with the one or more target objects. Accordingly, the systems and methods may accurately determine whether a vehicle has the traffic violation behavior and capture and/or collect evidence of the traffic violation behavior without any human cost.

FIG. 1 is a schematic diagram illustrating an exemplary traffic monitoring system according to some embodiments of the present disclosure. As shown, the traffic monitoring system 100 may include a server 110, a network 120, an image acquisition device 130, a terminal device 140, and a storage device 150.

The server 110 may be a single server or a server group. The server group may be centralized or distributed (e.g., the server 110 may be a distributed system). In some embodiments, the server 110 may be local or remote. For example, the server 110 may access information and/or data stored in the image acquisition device 130, the terminal device 140, and/or the storage device 150 via the network 120. As another example, the server 110 may be directly connected to the image acquisition device 130, the terminal device 140, and/or the storage device 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing device 112. The processing device 112 may process data and/or information relating to traffic monitoring to perform one or more functions described in the present disclosure. For example, based on one or more images captured by the image acquisition device 130 mounted near a crosswalk, the processing device 112 may determine whether a traffic violation behavior exists at the crosswalk (e.g., whether a vehicle does not stop for pedestrians at the crosswalk). In some embodiments, the processing device 112 may include one or more processing engines (e.g., single-core processing engine(s) or multi-core processor(s)). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

In some embodiment, the server 110 may be unnecessary and all or part of the functions of the server 110 may be implemented by other components (e.g., the image acquisition device 130, the terminal device 140) of the traffic monitoring system 100. For example, the processing device 112 may be integrated into the image acquisition device 130 or the terminal device 140 and the functions (e.g., monitoring a traffic behavior of a vehicle) of the processing device 112 may be implemented by the image acquisition device 130 or the terminal device 140.

The network 120 may facilitate the exchange of information and/or data for the traffic monitoring system 100. In some embodiments, one or more components (e.g., the server 110, the image acquisition device 130, the terminal device 140, or the storage device 150) of the traffic monitoring system 100 may transmit information and/or data to one or more other components of the traffic monitoring system 100 via the network 120. For example, the server 110 may obtain/acquire images from the image acquisition device 130 via the network 120. As another example, acquisition device 130 may transmit images to the storage device 150 for storage via the network 120. In some embodiments, the network 120 may be any type of wired or wireless network, or combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof.

The image acquisition device 130 may be configured to acquire at least one image (the "image" herein refers to a single image or a frame of a video). In some embodiments, the image acquisition device 130 may be mounted near a crosswalk of a road. The image acquisition device 130 may acquire images associated with one or more moving objects near the crosswalk and/or vehicles passing through the crosswalk, wherein the images may be used to detect traffic violation behaviors. In some embodiments, the image acquisition device 130 may include a camera 130-1, a video recorder 130-2, a sensor 130-3, etc. The camera 130-1 may include a gun camera, a dome camera, an integrated camera, a monocular camera, a binocular camera, a multi-view camera, or the like, or any combination thereof. The video recorder 130-2 may include a PC Digital Video Recorder (DVR), an embedded DVR, or the like, or any combination thereof. The sensor 130-1 may include an acceleration sensor (e.g., a piezoelectric sensor), a velocity sensor (e.g., a Hall sensor), a distance sensor (e.g., a radar, an infrared sensor), a steering angle sensor (e.g., a tilt sensor), a traction-related sensor (e.g., a force sensor), or the like, or any combination thereof. The at least one image acquired by the image acquisition device 130 may be a two-dimensional image, a three-dimensional image, a four-dimensional image, etc. In some embodiments, the image acquisition device 130 may include a plurality of components each of which can acquire an image. For example, the image acquisition device 130 may include a plurality of sub-cameras that can capture images or videos simultaneously. In some embodiments, the image acquisition device 130 may transmit the acquired image to one or more components (e.g., the server 110, the terminal device 140, and/or the storage device 150) of the traffic monitoring system 100 via the network 120.

The terminal device 140 may be configured to receive information and/or data from the server 110, the image acquisition device 130, and/or the storage device 150 via the network 120. For example, the terminal device 140 may receive images and/or videos from the image acquisition device 130. As another example, the terminal device 140 may transmit instructions to the image acquisition device 130 and/or the server 110. In some embodiments, the terminal device 140 may provide a user interface via which a user may view information and/or input data and/or instructions to the traffic monitoring system 100. For example, the user may view, via the user interface, information associated with a traffic violation behavior of a vehicle obtained from the server 110. As another example, the user may input, via the user interface, an instruction to set a traffic monitoring parameter of the image acquisition device 130. In some embodiments, the terminal device 140 may include a mobile device 140-1, a computer 140-2, a wearable device 140-3, or the like, or any combination thereof. In some embodiments, the terminal device 140 may include a display that can display information in a human-readable form, such as text, image, audio, video, graph, animation, or the like, or any combination thereof. The display of the terminal device 140 may include a cathode ray tube (CRT) display, a liquid crystal display (LCD), a light emitting diode (LED) display, a plasma display panel (PDP), a three dimensional (3D) display, or the like, or a combination thereof. In some embodiments, the terminal device 140 may be connected to one or more components (e.g., the server 110, the image acquisition device 130, and/or the storage device 150) of the traffic monitoring system 100 via the network 120.

The storage device 150 may be configured to store data and/or instructions. The data and/or instructions may be obtained from, for example, the server 110, the image acquisition device 130, and/or any other component of the traffic monitoring system 100. In some embodiments, the storage device 150 may store data and/or instructions that the server 110 may execute or use to perform exemplary methods described in the present disclosure. In some embodiments, the storage device 150 may include a mass storage device, a removable storage device, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memories may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more other components (e.g., the server 110, the image acquisition device 130, or the terminal device 140) of the traffic monitoring system 100. One or more components in the traffic monitoring system 100 may access the data or instructions stored in the storage device 150 via the network 120. In some embodiments, the storage device 150 may be directly connected to or communicate with one or more other components (e.g., the server 110, the image acquisition device 130, or the terminal device 140) of the traffic monitoring system 100. In some embodiments, the storage device 150 may be part of another component of the traffic monitoring system 100, such as the server 110, the image acquisition device 130, or the terminal device 140.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the traffic monitoring system 100 may include one or more additional components and/or one or more components of the traffic monitoring system 100 described above may be omitted. Additionally or alternatively, two or more components of the traffic monitoring system 100 may be integrated into a single component. A component of the traffic monitoring system 100 may be implemented on two or more sub-components.

Figure 2:
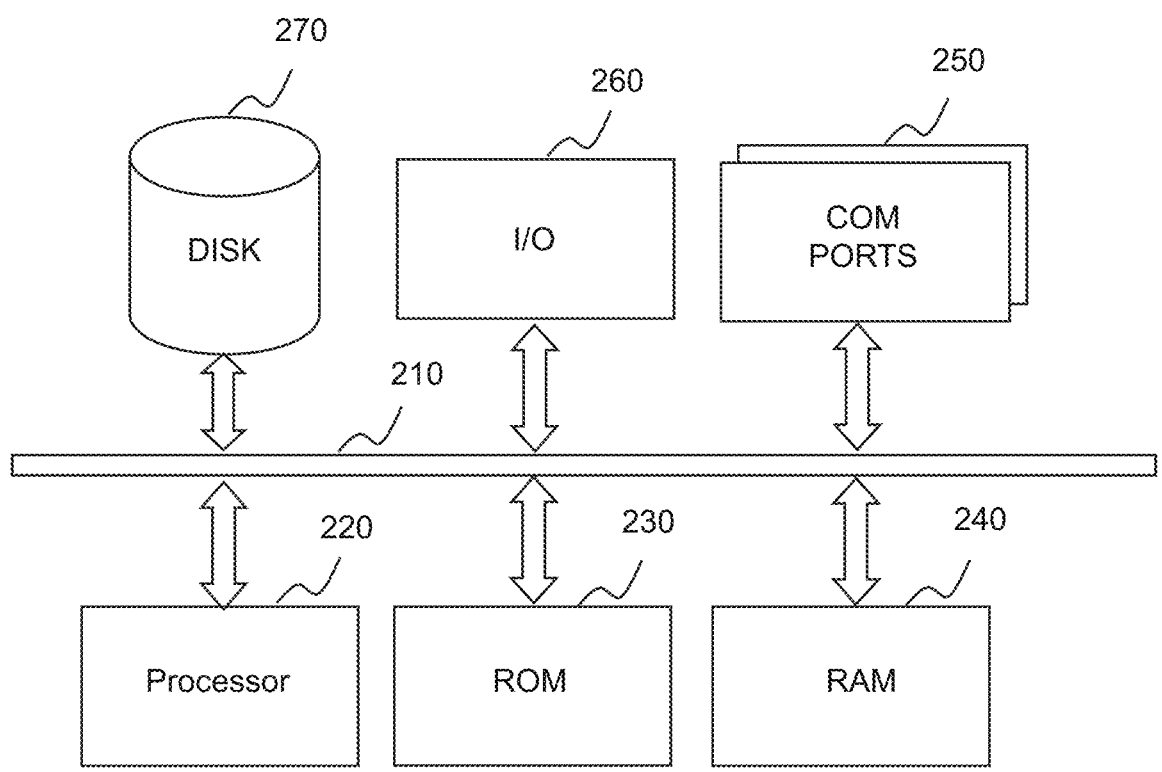
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure.

The computing device 200 may be used to implement any component of the traffic monitoring system 100 as described herein. For example, the processing device 112 may be implemented on the computing device 200, via its hardware, software program, firmware, or a combination thereof. Although only one such computer is shown, for convenience, the computer functions relating to traffic monitoring as described herein may be implemented in a distributed fashion on a number of similar platforms to distribute the processing load.

The computing device 200, for example, may include COM ports 250 connected to and from a network connected thereto to facilitate data communications. In some embodiments, the computing device 200 may include a transmission device (not shown) via which the computing device 200 may transmit information and/or data to external components. In some embodiments, the transmission device may include a Network Interface Controller (NIC) connected to an external network device. Alternatively, the transmission device may include a Radio Frequency (RF) module configured to communicate with a network (e.g., the network 120) via a wireless connection.

The computing device 200 may also include a processor (e.g., a processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include one or more storages configured to store various data files (e.g., program instructions) to be processed and/or transmitted by the computing device 200. In some embodiments, the one or more storages may include a high-speed random access memory (not shown), a non-volatile memory (e.g., one or more magnetic storage devices, flash memories, or other non-volatile solid-state memory) (not shown), a disk 270, a read-only memory (ROM) 230, or a random-access memory (RAM) 240, or the like, or any combination thereof. In some embodiments, the one or more storages may further include a remote storage corresponding to the processor 220. The remote storage may connect to the computing device 200 via the network 120. The computing device 200 may also include program instructions stored in the one or more storages (e.g., the ROM 230, RAM 240, and/or another type of non-transitory storage medium) to be executed by the processor 220. The methods and/or processes of the present disclosure may be implemented as the program instructions. The computing device 200 may also include an I/O component 260, supporting input/output between the computing device 200 and other components. The computing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the computing device 200 executes both operation A and operation B, it should be understood that operation A and operation B may also be performed by two different processors 220 jointly or separately in the computing device 200 (e.g., a first processor executes operation A and a second processor executes operation B, or the first and second processors jointly execute operations A and B).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 3:
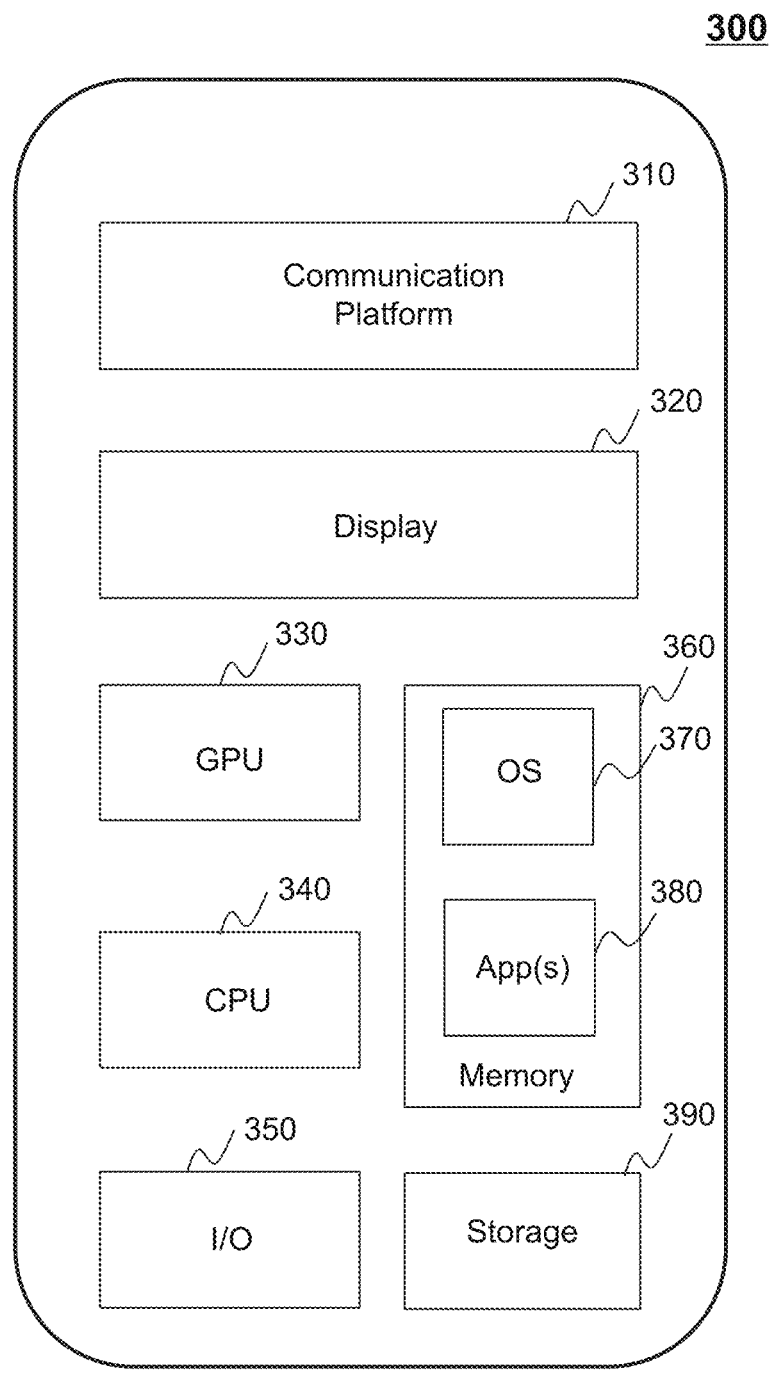
FIG. 3 is a schematic diagram illustrating exemplary hardware and/or software components of an exemplary terminal device according to some embodiments of the present disclosure.

FIG. 3 is a schematic diagram illustrating exemplary hardware and/or software components of an exemplary terminal device according to some embodiments of the present disclosure. In some embodiments, the terminal device 140 may be implemented on the terminal device 300 shown in FIG. 3.

As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300.

In some embodiments, an operating system 370 (e.g., iOS™, Android™, Windows Phone™, etc.) and one or more applications (Apps) 380 may be loaded into the memory 360 from the storage 390 in order to be executed by the CPU 340. The applications 380 may include a browser or any other suitable mobile apps for receiving and rendering information relating to traffic monitoring or other information from the processing device 112. User interactions with the information stream may be achieved via the I/O 350 and provided to the processing device 112 and/or other components of the traffic monitoring system 100 via the network 120.

FIG. 4 is a flowchart illustrating an exemplary process for marking a violation state of a vehicle according to some embodiments of the present disclosure. In some embodiments, the process 400 may be implemented as a set of instructions (e.g., an application) stored in a storage device (e.g., the storage device 150, the ROM 230 or RAM 240). The processor 220 and/or the modules in FIG. 7 may execute the set of instructions, and when executing the instructions, the processor 220 and/or the modules may be configured to perform the process 400. The operations of the illustrated process presented below are intended to be illustrative. In some embodiments, the process 400 may be accomplished with one or more additional operations not described and/or without one or more of the operations discussed. Additionally, the order in which the operations of the process 400 illustrated in FIG. 4 and described below is not intended to be limiting.

In 4202, a target object which should be given precedence with respect to a vehicle may be determined from one or more moving objects by performing an angle correction on the one or more moving objects. As used herein, the one or more moving objects may include one or more objects stay or moving in a predetermined region on a road.

In some embodiments, the one or more moving objects may include a pedestrian (e.g., a person traveling on foot or by a wheelchair, a scooter, or a skateboard), a bicyclist, a driver of a non-motorized vehicle (e.g., a motorbike), or the like, or any combination thereof. The predetermined region refers to a waiting region in which a moving object should stay to wait to cross the road. For example, a region including one or more zebra crossings at an end of a crosswalk may be determined as the predetermined region. As another example, a region within a certain distance (e.g., 1 m, 1.5 m, 2 m, or 2.5 m) from the outermost zebra crossing (e.g., the one closest to a road curb) at an end of a crosswalk may be determined as the predetermined region. An angle correction performed on a moving object refers to correcting an angle of a moving direction of the moving object with respect to a reference direction. In some embodiments, a two dimensional (2D) image including the moving object may be acquired by a monitoring device, and the 2D image may be represented in a 2D coordinate system including an X-axis and a Y-axis. The reference direction may be the X-axis direction (or referred to as a horizontal direction herein). In some embodiments, the monitoring device may be also referred to as a camera as described in connection with operation 910.

In 4204, when it is determined that a moving direction of the target object is a moving direction towards the middle of the road and a target vehicle passing through the predetermined region is not courteous to the target object, the state of the target vehicle may be marked as a violation state. As used herein, a vehicle passing through the predetermined region may refer to a vehicle passing through a crosswalk at the road where the predetermined region located.

According to operations 4202 and 4204 described above, the target object in the predetermined region may be determined by correcting the moving angle of each of the one or more moving objects, thereby ensuring an accurate determination of the moving angle of the target object. In addition, the target vehicle that is not courteous to the target object may be marked only when it is determined that the target object is moving towards the middle of the road, thereby avoiding wrongly marking the state of the target vehicle as the violation state when the target object is wandering. Accordingly, problems in the prior arts that violation behaviors cannot be effectively marked may be solved, a vehicle that has a traffic violation behavior may be detected accurately, and the vehicle has the traffic violation behavior may be effectively marked.

Optionally, the above operations may be executed by a device including but not limited to the monitoring device.

In some embodiments, to determine the target object which should be given precedence with respect to a vehicle from the one or more moving objects by performing the angle correction on the one or more moving objects, one or more operations described below may be performed. An average angle between at least two lane lines captured by the monitoring device and a horizontal direction (i.e., an X-axis direction of an image including the moving object) may be determined. A displacement of a first moving object included in the one or more moving objects may be determined based on two image frames captured by the monitoring device. The first moving object may be determined as the target object when it is determined that the average angle and the displacement satisfy an Equation (1) and an Equation (2) as below:

$$|\alpha - \beta - \arctan(\Delta y / \Delta x)| \leq \lambda, \quad (1)$$

$$|\Delta x \times \cos(\alpha - \beta)| \geq s, \quad (2)$$

where $\alpha$ refers to the average angle, $\beta$ refers to a predetermined angle (i.e., a constant value, e.g., 85°, 87°, 89°, 90°, 92°, etc), $\Delta x$ refers to a first displacement along the horizontal direction included in the displacement, $\Delta y$ refers to a second displacement along the vertical direction included in the displacement, $\lambda$ refers to a threshold angle, and s refers to a threshold distance. As used herein, the vertical direction may be perpendicular to the horizontal direction as aforementioned. For example, if the horizontal direction is an X-axis of a 2D image, the vertical direction may be a Y-axis of the 2D image.

Figure 12:
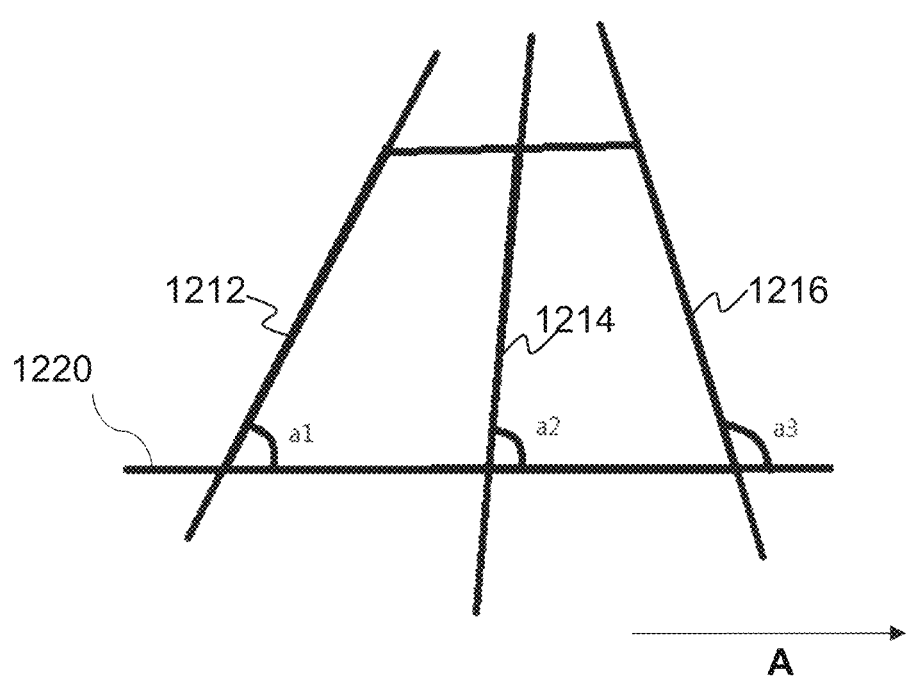
FIG. 12 is a schematic diagram illustrating exemplary angles between lane lines and a horizontal direction according to some embodiments of the present disclosure.

In some embodiments, the at least two lane lines may be detected using a LaneNet algorithm (i.e., an exemplary lane line detection algorithm) or manually. The one or more moving objects (e.g., a pedestrian, a non-motorized vehicle, etc.) and vehicles in image frames may be identified using a You Only Look Once version 3 (YOLO 3) model (i.e., an exemplary object detection algorithm). The one or more moving objects and the vehicles may be tracked using a kernelized correlation filters (KCF) algorithm (i.e., an exemplary target tracking algorithm). In some embodiments, an application scenario of the monitoring device may have an angular offset, the angle correction may be performed to determine the moving direction of each of the one or more moving objects (e.g., a pedestrian, a non-motorized vehicle) and determine whether one of the one or more moving objects is a target object which should be given precedence with respect to a vehicle. Specifically, the average angle $\alpha$ between the at least two lane lines (e.g., lines 1212, 1214, and 1216 shown in FIG. 12) and the horizontal direction (e.g., a direction as denoted by an arrow A in FIG. 12) may be determined firstly, wherein $\alpha = (\alpha_1 + \alpha_2 + \alpha_3)/3$. FIG. 12 is a diagram illustrating exemplary angles between lane lines and the horizontal direction according to some embodiments of the present disclosure. More descriptions about the angles between lane lines and the horizontal direction may be found in FIG. 12.

Secondly, the displacements $\Delta x$ and $\Delta y$ of one of the one or more moving objects may be determined based on two image frames, wherein $\Delta x$ and $\Delta y$ may both be positive values. Finally, whether the one of the one or more moving objects is an object which should be given precedence with respect to a vehicle may be determined according to Equation (1) by setting a threshold $\lambda$. Specifically, when Equation (1) is satisfied, the one of the one or more moving objects may be determined as the target object. When Equation (1) is not satisfied, the one of the one or more moving objects may not be determined as the target object.

In some embodiments, to determine whether the moving direction of the target object is a moving direction towards the middle of the road, a first image frame and a second image frame sequentially captured by the monitoring device may be obtained. The second image frame may be an image captured at a time point that is after a predetermined time interval from a time point when the first image frame is captured. The first image frame and the second image frame may be images including the target object. Whether the moving direction of the target object is a moving direction towards the middle of the road may be determined based on an orientation of a first position relative to a second position. As used herein, the first position may be a location of the target object included in the first image frame, and the second position may be a location of the target object included in the second image frame. In some embodiments, the first position may be a position of the target object in a first image frame that includes the target object (e.g., an image frame captured when the target object enters a monitoring region of the monitoring device (e.g., the predetermined region). A preliminary moving direction of the target object may be determined based on the first position of the target object in the first image frame. For example, if the first position of the target object is in the vicinity of an outer edge of the predetermined region, the preliminary moving direction of the target object may be determined as a direction towards the middle of the road. Secondly, the second position of the target object in the second image frame may be determined by recording a position of the target object after a predetermined time interval. The moving direction of the target object may be determined based on the first position and the second position. A value indicating a state that whether the target object should be given precedence with respect to a vehicle may be assigned to the target object based on the moving direction of the target object.

In some embodiments, before determining the target object which should be given precedence with respect to a vehicle from the one or more moving objects by performing the angle correction on the one or more moving objects, a signal lamp may be controlled to generate a prompt after determining that the one or more moving objects are in the predetermined region. In some embodiments, regions located on two ends of the crosswalk may be designated as waiting regions. A region covering the crosswalk may be designated as a walking region according to different scenarios. Each of the one or more moving objects (e.g., a pedestrian, a non-motorized vehicle) in the waiting region may be labeled with an identification number. If a moving object is in the waiting region, a signal light may be used to remind the vehicles about the moving object. The signal light may emit a predetermined light, for example, a red light, a light that flashes with a predetermined frequency, or the like. Optionally, the signal light may be used for generating a sound or light, and the target object may be reminded to pay attention to vehicles by the light and the sound.

Figure 15:
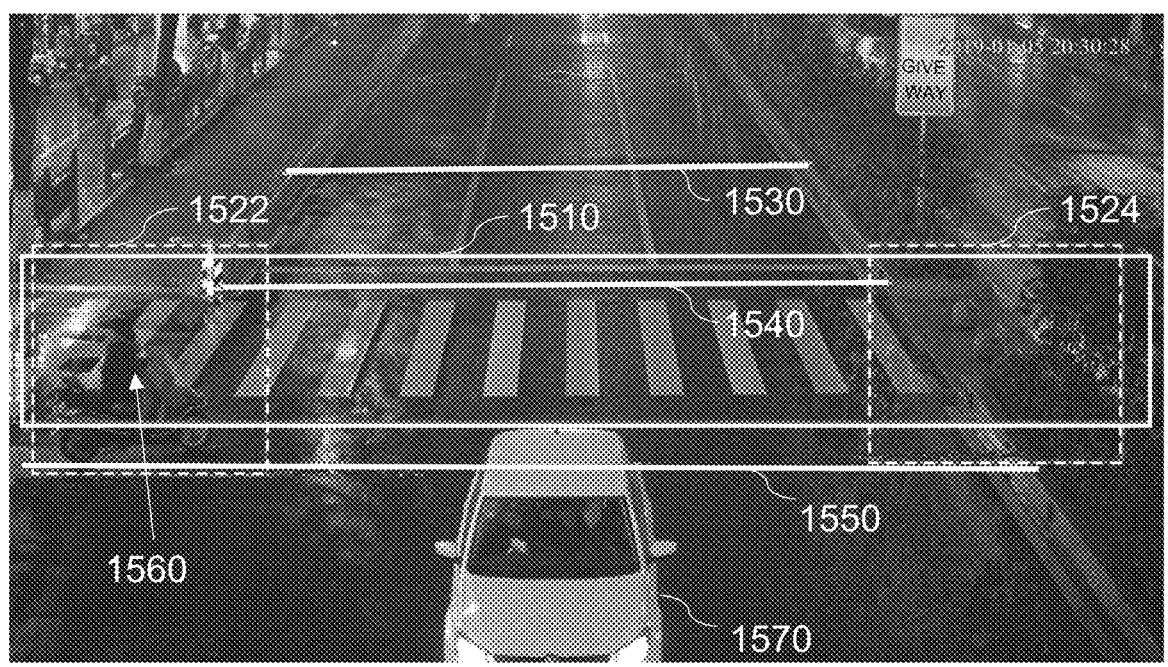
FIG. 15 illustrates an exemplary image associated with a vehicle at a predetermined position captured by a camera according to some embodiments of the present disclosure.

In some embodiments, after determining that the moving direction of the target object is a moving direction towards the middle of the road, and before determining that the target vehicle passing through the predetermined region is not courteous to the target object, a binding relationship between the target object and the target vehicle may be established, and an identity document (ID) may be assigned to the binding relationship. The marking the state of the target vehicle as the violation state may include marking the state of the target vehicle corresponding to the ID associated with the target vehicle and the target object as the violation state. In some embodiments, the target object may be bound to a plurality of vehicles identified by the monitoring device to establish a plurality of binding relationships. When establishing the binding relationships, the target object may be bound to each of the vehicles. The vehicles may include vehicles in all image frames captured by the monitoring device when the target object is in the waiting region. For each of the binding relationships, an ID may be generated, and a state attribute of the ID (or corresponding to the target object and the vehicle) may be updated. As used herein, a state attribute associated with an ID may indicate whether a moving object associated with the ID should be given precedence with respect to a vehicle. FIG. 15 is an exemplary image including a vehicle 1570 at a predetermined position at a crosswalk captured by a camera according to some embodiments of the present disclosure. As illustrated in FIG. 15, a pedestrian 1560 is in a state that should be given precedence with respect to the vehicle 1570. The vehicle 1570 may be marked as a violation state if three images indicating that the vehicle 1570 crosses lines 1530, 1540, and 1550 are captured, which suggests that the vehicle 1570 does not stop for the pedestrian at the crosswalk.

In some embodiments, after marking the state of the target vehicle as the violation state, the violation state of the target vehicle may be canceled if, according to images captured by the monitoring device, it is determined that a door of the target vehicle is opened and the target object disappears after a predetermined period after the door is opened (which suggests that the target object gets into the target vehicle). In some embodiments, a count of lanes between the target vehicle and the target object may be determined based on a distance between the target vehicle and the target object in a direction that a moving object moves across the road (e.g., a direction as denoted by an arrow N in FIG. 13). If it is determined that the count of lanes between the target vehicle and the target object is zero, it may be determined that the target object disappears. It should be noted that any other methods may be used to identify the disappearance of the target object and determine whether the target object gets into the vehicle.

In some embodiments, at least one of a license plate recognition operation, a speed detection operation, a window detection operation, or a face detection operation may be performed on the target vehicle, and a processing result may be recorded.

In some embodiments, the recorded processing result may be used to acquire subsequent information and/or be compared with the subsequent information. The subsequent information may include, for example, license plate information, driver information, etc., in a database (e.g., a vehicle database, a face recognition database, etc.). For example, the license plate recognition operation may be configured to upload license plate information of the target vehicle to a vehicle database and compare the license plate information of the target vehicle with license plate information in the vehicle database. The speed detection operation may be configured to determine a current speed of the target vehicle based on a displacement of the target vehicle between two consecutive image frames. If the speed of the target vehicle exceeds a defined speed limit of the current road, the state of the target vehicle may be recorded as the violation state. The window detection operation may be configured to detect a front windshield of the target vehicle. Additionally or alternatively, other violation behaviors (e.g., not wearing a seat belt) may be identified and marked. The face recognition operation may be configured to compare the face of the driver of the target vehicle with faces stored in a face recognition database to obtain profile information of the target vehicle.

Figure 5:
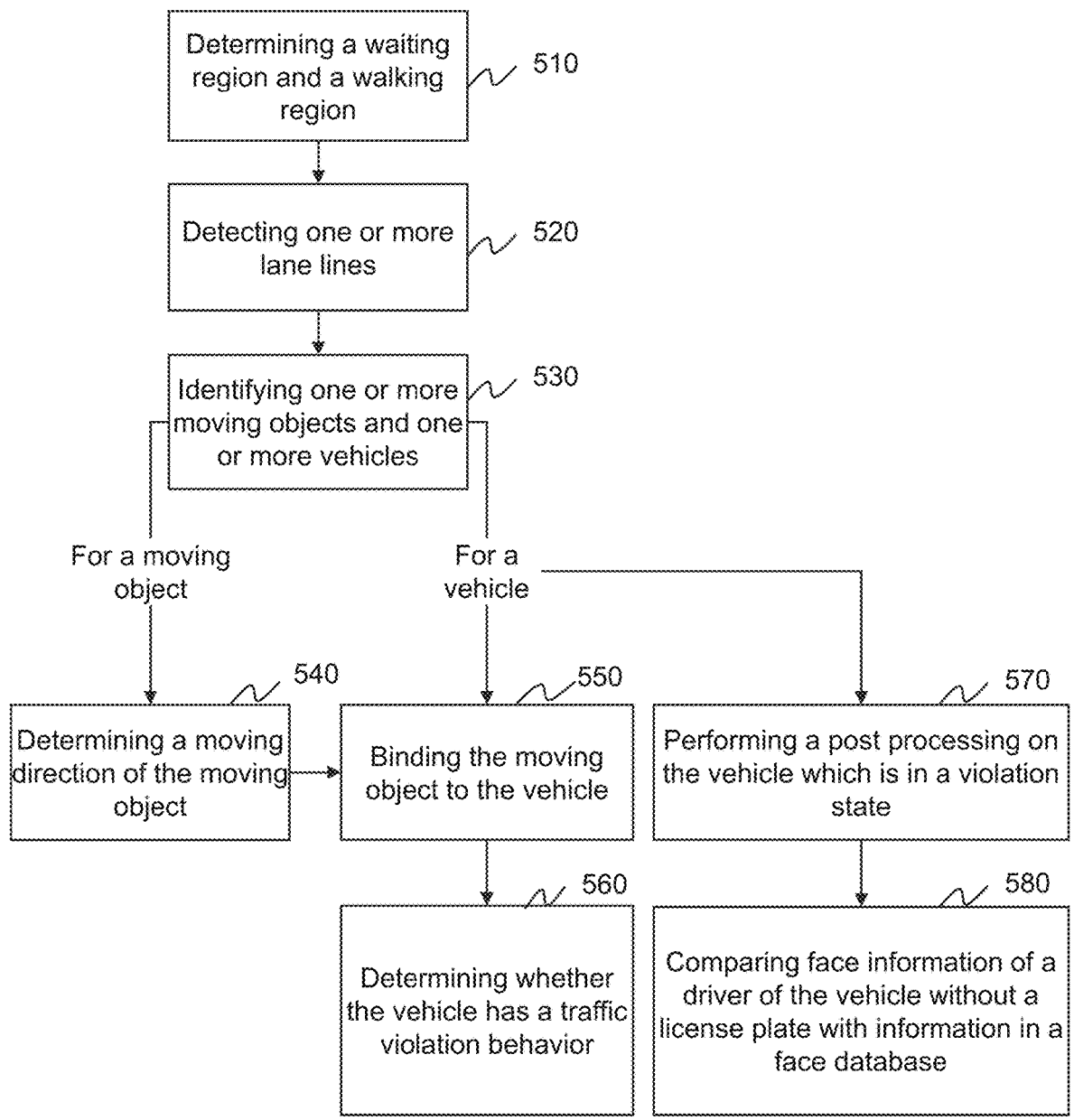
FIG. 5 is a flowchart illustrating an exemplary process for capturing images associated with a vehicle that is uncourteous to a target object on a crosswalk according to some embodiments of the present disclosure.

It should be noted that the above description is merely provided for the purposes of illustration, and not intended to limit the scope of the present disclosure. For persons having ordinary skills in the art, multiple variations and modifica- FIG. 5 is a flowchart illustrating an exemplary process for capturing images associated with a vehicle that is uncourteous to a target object on a crosswalk according to some embodiments of the present disclosure. In some embodiments, the process 500 may be implemented as a set of instructions (e.g., an application) stored in a storage device (e.g., the storage device 150, the ROM 230 or RAM 240). The processor 220 and/or the modules in FIG. 7 may execute the set of instructions, and when executing the instructions, the processor 220 and/or the modules in FIG. 7 may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process 500 illustrated in FIG. 5 and described below is not intended to be limiting.

In 510, a region at each end of a crosswalk on a road may be determined as a waiting region, and a region covering the crosswalk may be determined as a walking region.

In 520, one or more lane lines may be detected using a LaneNet algorithm or manually.

In 530, one or more moving objects (e.g., a pedestrian, a non-motorized vehicle) and one or more vehicles in a plurality of image frames may be identified using a YOLO 3 model. The one or more moving objects and vehicles may be tracked using a KCF algorithm for target tracking. The image frames may be captured by a monitoring device near the crosswalk.

In 540, an application scenario of the monitoring device may have an angular offset, an angle correction may be performed to determine a moving direction of each of the one or more moving objects (e.g., a pedestrian, a non-motorized vehicle) and determine whether one of the one or more moving objects is a target object which should be given precedence with respect to a vehicle. Specifically, an average angle $\alpha$ between the lane lines (e.g., lines 1212, 1214, and 1216 shown in FIG. 12) and a horizontal direction (e.g., a direction as denoted by an arrow A in FIG. 12) may be determined firstly. For example, as illustrated in FIG. 12, $\alpha = (\alpha_1 + \alpha_2 + \alpha_3)/3$. Secondly, displacements $\Delta x$ and $\Delta y$ of one of the one or more moving objects may be determined based on two image frames, wherein $\Delta x$ and $\Delta y$ may both be positive values. Finally, whether the one of the one or more moving objects is an object which should be given precedence with respect to a vehicle may be determined according to Equation (1) described in FIG. 4 by setting a threshold $\lambda$.

In 550, each of the one or more moving objects may be bound to each vehicle identified in the image frames. An ID may be assigned to each pair of bounded moving objects and vehicles. A state attribute of each ID (or corresponding to each pair of bounded moving objects and vehicles) may be updated simultaneously. If the state attribute of an ID indicates that the corresponding moving object should be given precedence with respect to a vehicle, and three images of the vehicle are captured at a front line, a middle line, and a back line lines, respectively, such as lines 1530, 1540, and 1550 shown in FIG. 15, the vehicle corresponding to the ID may be recorded as a vehicle in a violation state. In some embodiments, a vehicle being in a violation state may also be referred to as a target vehicle.

In 560, whether the vehicle has a traffic violation behavior may be determined. Each of the one or more moving objects (e.g., a pedestrian, a non-motorized vehicle) in the waiting region may be labeled with an identification number. If a moving object is in the waiting region, vehicles may be prompted by a signal light. Firstly, an initial position of a specific moving object in an initial image frame including the specific moving object (e.g., captured when the specific moving object enters the waiting region) may be recorded. A preliminary moving direction of the specific moving object may be determined based on the initial image frame. Secondly, a current position of the specific moving object may be recorded. A moving direction of the specific moving object may be determined based on the current position and a previous position of the specific moving object in a previous image frame. A value indicating the state that whether the specific moving object should be given precedence with respect to a vehicle may be assigned to the specific moving object based on the moving direction of the specific moving object. Then, the specific moving object may be bound to each vehicle identified in image frames including the specific moving object and the vehicle(s), and an ID may be assigned to each pair of bounded specific moving objects and vehicles. A state attribute of each ID may be updated simultaneously. If the state attribute of a specific ID indicates that the corresponding moving object should be given precedence with respect to a vehicle, and three images of the vehicle are captured at a front line, a middle line, and a back line, respectively, the vehicle may be deemed as a vehicle in a violation state. As used herein, a vehicle in a violation state may be also referred to as a target vehicle.

Figure 6:
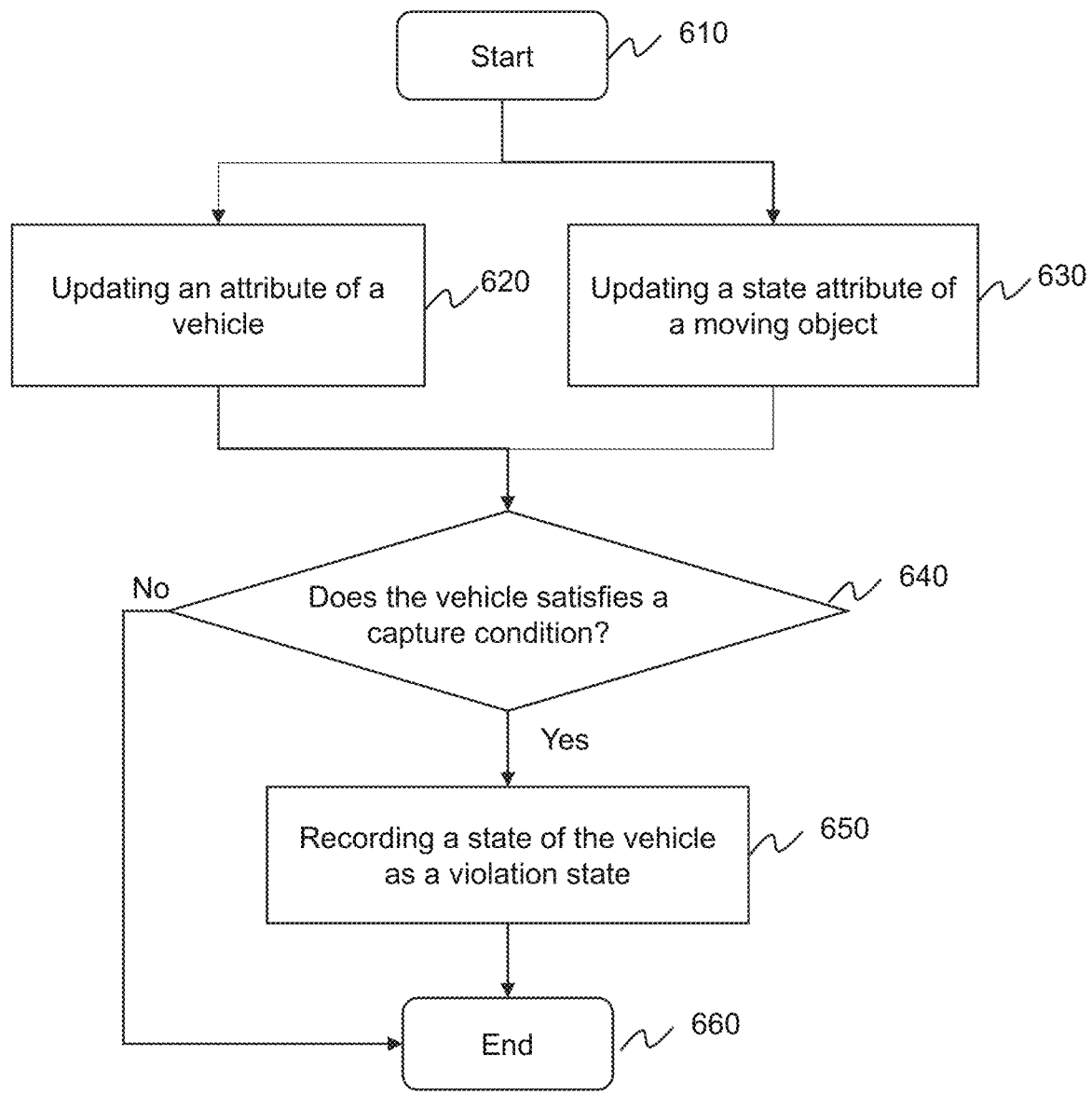
FIG. 6 is a flowchart illustrating an exemplary process for determining whether a vehicle is not courteous to a moving object according to some embodiments of the present disclosure.

FIG. 6 is a flowchart illustrating an exemplary process for determining whether a vehicle is not courteous to a moving object according to some embodiments of the present disclosure. As illustrated in FIG. 6, the process 600 may include one or more following operations.

In 610, the process 600 may be started for a predetermined region. In 620 and 630, a target ID may be generated by binding a moving object with a vehicle. The state attribute of the moving object and the corresponding vehicle may be updated simultaneously. In 640, whether the vehicle satisfies a capturing condition may be determined. As used herein, the capturing condition refers to that the vehicle is not courteous to the moving object when the vehicle passes through the predetermined region. In 650, the state of the vehicle may be recorded as a violation state. In 660, the process 600 for the predetermined region may be ended.

In 570, a post-processing may be performed on the target vehicle. In some embodiments, the post-processing may include a license plate recognition, a speed detection, a window detection, a face detection, or the like, or any combination thereof. By performing the post-processing, it may be convenient to obtain subsequent information (e.g., face information of a driver of the target vehicle) associated with the target vehicle and compare the information with information in a database.

In 580, if the target vehicle is a vehicle without a license, the recorded face information of the driver of the target vehicle may be compared with information in a database of face information to obtain profile information of the driver of the target vehicle.

Figure 13:
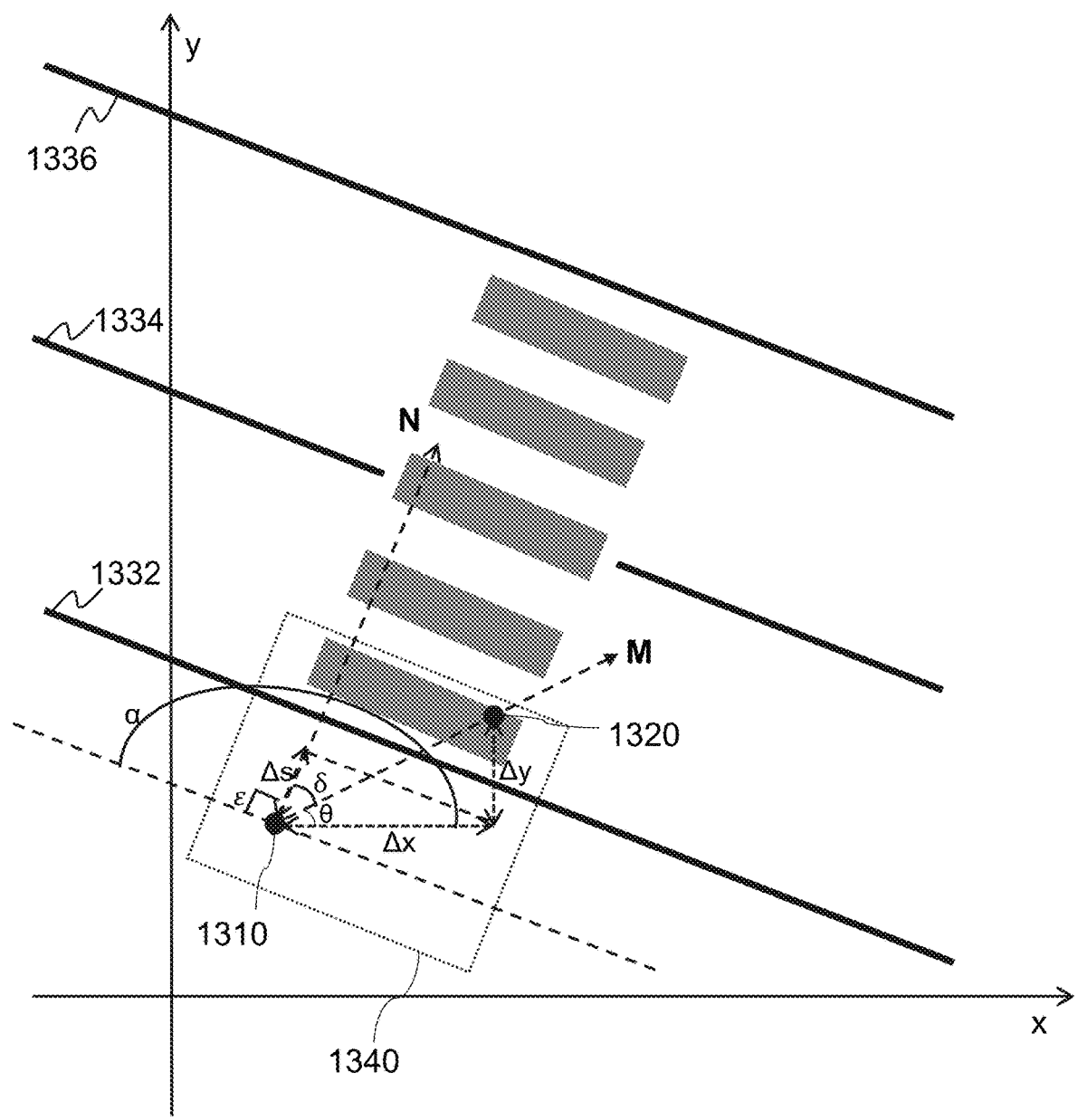
FIG. 13 is a schematic diagram illustrating an exemplary process for determining a candidate intermediate moving direction corresponding to two adjacent positions according to some embodiments of the present disclosure.

In some embodiments, a count of lanes between the target object (e.g., a pedestrian or a non-motorized vehicle) and the target vehicle may be determined based on a distance between the target object and the target vehicle in a direction that a moving object crossing the road (e.g., a direction as denoted by an arrow N in FIG. 13). If it is determined that the count of lanes between the target object and the target vehicle is zero, a state (e.g., open or closed) of a door of the target vehicle may be detected. An alarm and/or the violation state of the target vehicle may be canceled, if it is determined that the door of the target vehicle is opened and the target object disappears after a predetermined period after the door is opened (which suggests that the target object gets into the target vehicle).

By performing the license plate recognition, the speed detection, the window detection, and/or the face detection on the target vehicle, it may be convenient to obtain subsequent information (e.g., face information of the driver of the target vehicle) associated with the target vehicle and compare the information with information in a database. In particular, when the target vehicle is a vehicle without a license, the recorded face information of the driver of the target vehicle may be compared with information in a database of face information to obtain profile information of the driver of the target vehicle.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 7:
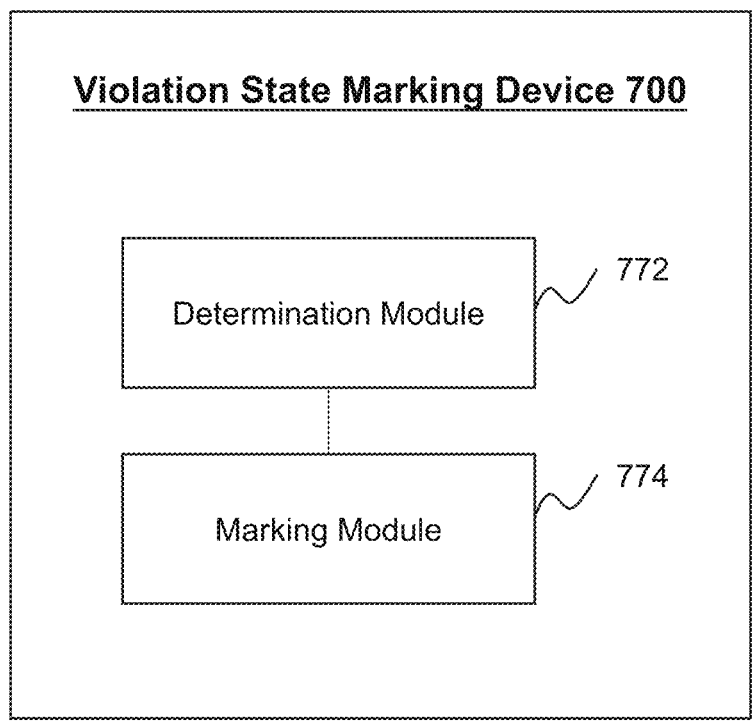
FIG. 7 is a block diagram illustrating an exemplary violation state marking device according to some embodiments of the present disclosure.

FIG. 7 is a block diagram illustrating an exemplary violation state marking device according to some embodiments of the present disclosure. As illustrated in FIG. 7, the violation state marking device 700 may include a determination module 772 and a marking module 774. In some embodiments, one or more components of the violation state marking device 700 may be integrated into the processing device 112.

The determination module 772 may be configured to determine a target object which should be given precedence with respect to a vehicle from one or more moving objects by performing an angle correction on the one or more moving objects. As used herein, the one or more moving objects may include one or more objects stay or moving in a predetermined region on a road. The predetermined region may be referred to as a waiting region as described elsewhere in the present disclosure (e.g., FIG. 4 and the descriptions thereof).

The marking module 774 may be configured to mark a state of a target vehicle as a violation state when it is determined that a moving direction of the target object is a moving direction towards the middle of the road and the target vehicle passing through the predetermined region is not courteous to the target object.

In some embodiments, the determination module 772 may determine the target object which should be given precedence with respect to a vehicle from the one or more moving objects by performing the angle correction on the one or more moving objects according to one or more operations described below.

An average angle between at least two lane lines captured by a monitoring device and a horizontal direction (e.g., an X-axis direction of an image including the moving object(s)) may be determined.

A displacement of a first moving object included in the one or more moving objects may be determined based on two image frames captured by the monitoring device.

The first moving object may be determined as the target object which should be given precedence with respect to a vehicle when it is determined that the average angle and the displacement satisfy Equation (1) described in FIG. 4.

In some embodiments, the marking module 774 may determine that the moving direction of the target object is a moving direction towards the middle of the road according to one or more operations described below.

A first image frame and a second image frame sequentially captured by the monitoring device may be obtained. The second image frame may be an image captured at a time point that is after a predetermined time interval from a time point when the first image frame is captured. The first image frame and the second image frame may be images including the target object.

Whether the moving direction of the target object is a moving direction towards the middle of the road may be determined based on an orientation of a first position relative to a second position. As used herein, the first position may be a location of the target object included in the first image frame, and the second location may be a location of the target object included in the second image frame.

In some embodiments, before determining the target object which should be given precedence with respect to a vehicle from the one or more moving objects by performing the angle correction on the one or more moving objects, the violation state marking device 700 may further be configured to control a signal lamp to generate a prompt after determining that the one or more moving objects are in the predetermined region.

In some embodiments, after determining that the moving direction of the target object is a moving direction towards the middle of the road and before determining that the target vehicle passing through the predetermined region is not courteous to the target object, the violation state marking device 700 may further be configured to establish a binding relationship between the target object and the target vehicle and assign an ID to the binding relationship. The marking the state of the target vehicle as the violation state, the violation state marking device 700 may further be configured to mark the state of the target vehicle corresponding to the target ID as the violation state.

In some embodiments, after marking the state of the target vehicle as the violation state, the violation state marking device 700 may further be configured to cancel the violation state of the target vehicle if, according to images captured by the monitoring device, it is determined that a door of the target vehicle is opened and the target object disappears after a predetermined period after the door is opened.

In some embodiments, the violation state marking device 700 may further be configured to perform a post-processing on the target vehicle. The post-processing may include a license plate recognition, a speed detection, a window detection, a face recognition, or the like, or any combination thereof. The violation state marking device 700 may record one or more results of the post-processing and/or compare the one or more results with information in one or more databases.

The modules in the violation state marking device 700 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units.

Figure 8:
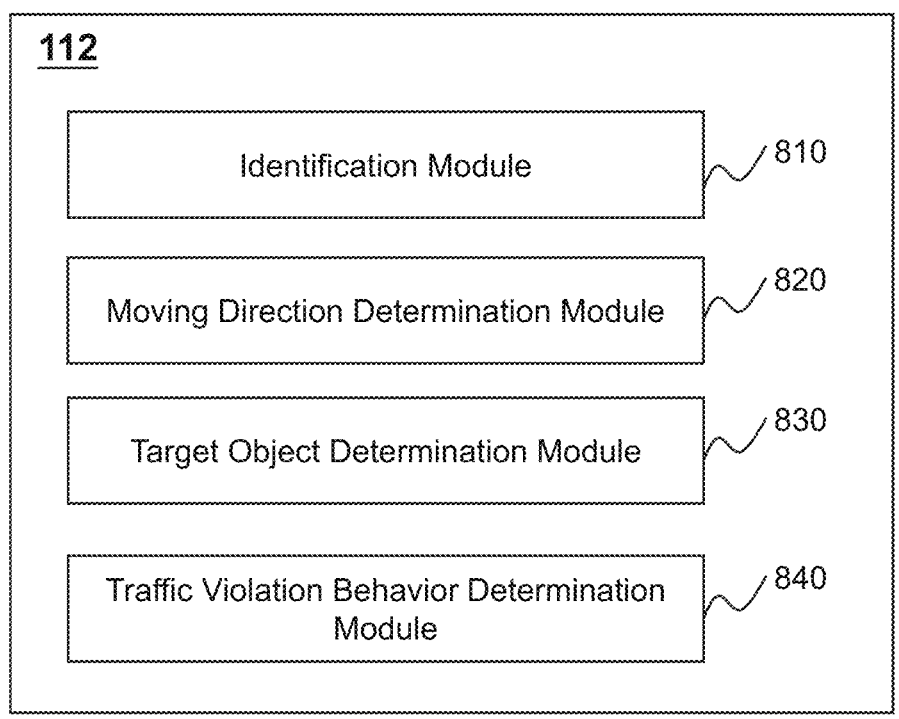
FIG. 8 is a block diagram illustrating an exemplary processing device according to some embodiments of the present disclosure.

FIG. 8 is a block diagram illustrating an exemplary processing device 112 according to some embodiments of the present disclosure. As illustrated in FIG. 8, the processing device 112 may include an identification module 810, a moving direction determination module 820, a target object determination module 830, and a traffic violation behavior determination module 840.

The identification module 810 may be configured to identify one or more candidate objects within a predetermined region associated with a crosswalk at a road. For example, the identification module 810 may identify the one or more candidate objects from one or more images (or image frames of a video) including the one or more candidate objects captured by a camera (e.g., the image acquisition device 130). The identification module 810 may further be configured to identify one or more vehicles within a predetermined range of the crosswalk. For example, the identification module 810 may identify the one or more vehicles from one or more images (or image frames of a video) including the one or more vehicles captured by the camera (e.g., the image acquisition device 130). In some embodiments, the identification module 810 may identify the one or more candidate objects and/or the one or more vehicles using an object detection algorithm (e.g., a YOLO 3algorithm).

The moving direction determination module 820 may be configured to determine a moving direction of each of the one or more candidate objects with respect to the road. In some embodiments, the moving direction determination module 820 may determine whether an initial position of the candidate object is in the vicinity of an outer edge of the predetermined region. In response to a determination that the initial position is not in the vicinity of the outer edge of the predetermined region, the moving direction determination module 820 may determine a preliminary moving direction for the candidate object. In some embodiments, the moving direction determination module 820 may determine a plurality of intermediate positions of the candidate object within the predetermined region based on a plurality of sequential images associated with the candidate object, the plurality of sequential images being sequentially captured at a plurality of intermediate time points immediately after the initial time point. The moving direction determination module 820 may determine a plurality of intermediate moving directions of the candidate object based on a plurality of positions including the initial position and the plurality of intermediate positions, wherein each of the plurality of intermediate moving directions corresponds to two adjacent positions of the plurality of positions. The moving direction determination module 820 may determine the moving direction of the candidate object based at least in part on the plurality of intermediate moving directions. For example, the moving direction determination module 820 may determine the moving direction of the candidate object based on the preliminary moving direction and the plurality of intermediate moving directions.

The target object determination module 830 may be configured to determine one or more target objects from the one or more candidate objects based on one or more moving directions corresponding to the one or more candidate objects. The target object determination module 830 may determine whether the moving direction of the candidate object is a direction away from the road or a direction crossing the road. In response to a determination that the moving direction is a direction crossing the road, the target object determination module 830 may designate the candidate object as a target object. In some embodiments, in response to a determination that the moving direction of the candidate object is a direction away from the road, the target object determination module 830 may designate the candidate object as a negative object.

The traffic violation behavior determination module 840 may be configured to obtain, form a camera, one or more images associated with each of the one or more vehicles at one or more predetermined positions. In some embodiments, for each of the one or more target objects, the traffic violation behavior determination module 840 may generate a binding relationship between each of the one or more vehicles and the target object. In some embodiments, the traffic violation behavior determination module 840 may generate a binding relationship between each of the one or more vehicles and each negative object. The traffic violation behavior determination module 840 may obtain the one or more images associated with each of the one or more vehicles based on the binding relationship.

The traffic violation behavior determination module 840 may further be configured to determine whether the vehicle has a traffic violation behavior associated with the one or more target objects based on the one or more images. In some embodiments, for a vehicle, the traffic violation behavior determination module 840 may determine whether one or more images associated with the vehicle are captured within a first predetermined time period. In response to a determination that the one or more images associated with the vehicle are captured within the first predetermined time period, the traffic violation behavior determination module 840 may determine that the vehicle has a traffic violation behavior associated with the one or more target objects. In some embodiments, if the one or more images of a vehicle are captured within the first predetermined time period, the traffic violation behavior determination module 840 may determine whether a door of the vehicle is open and whether at least one of the one or more target objects disappears within a second predetermined time period. If the door of the vehicle is open and the at least one of the one or more target objects disappears, the traffic violation behavior determination module 840 may speculate that the at least one target object gets on the vehicle, and determine that the vehicle does not have the traffic violation behavior associated with the one or more target objects.

The modules in the processing device 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units.

For example, the moving direction determination module 820 and the target object determination module 830 may be integrated into a single module which may determine both the one or more moving directions of the one or more candidate objects and the one or more target objects. As another example, the processing device 112 may further include a transmission module configured to transmit signals (e.g., an electrical signal, an electromagnetic signal) to one or more components (e.g., the terminal device 140) of the traffic monitoring system 100. As a further example, the processing device 112 may include a storage module (not shown) used to store information and/or data (e.g., a map of a region, position information of a plurality of crosswalks and/or a plurality of monitoring devices in the region) associated with the traffic monitoring system 100.

Figure 9:
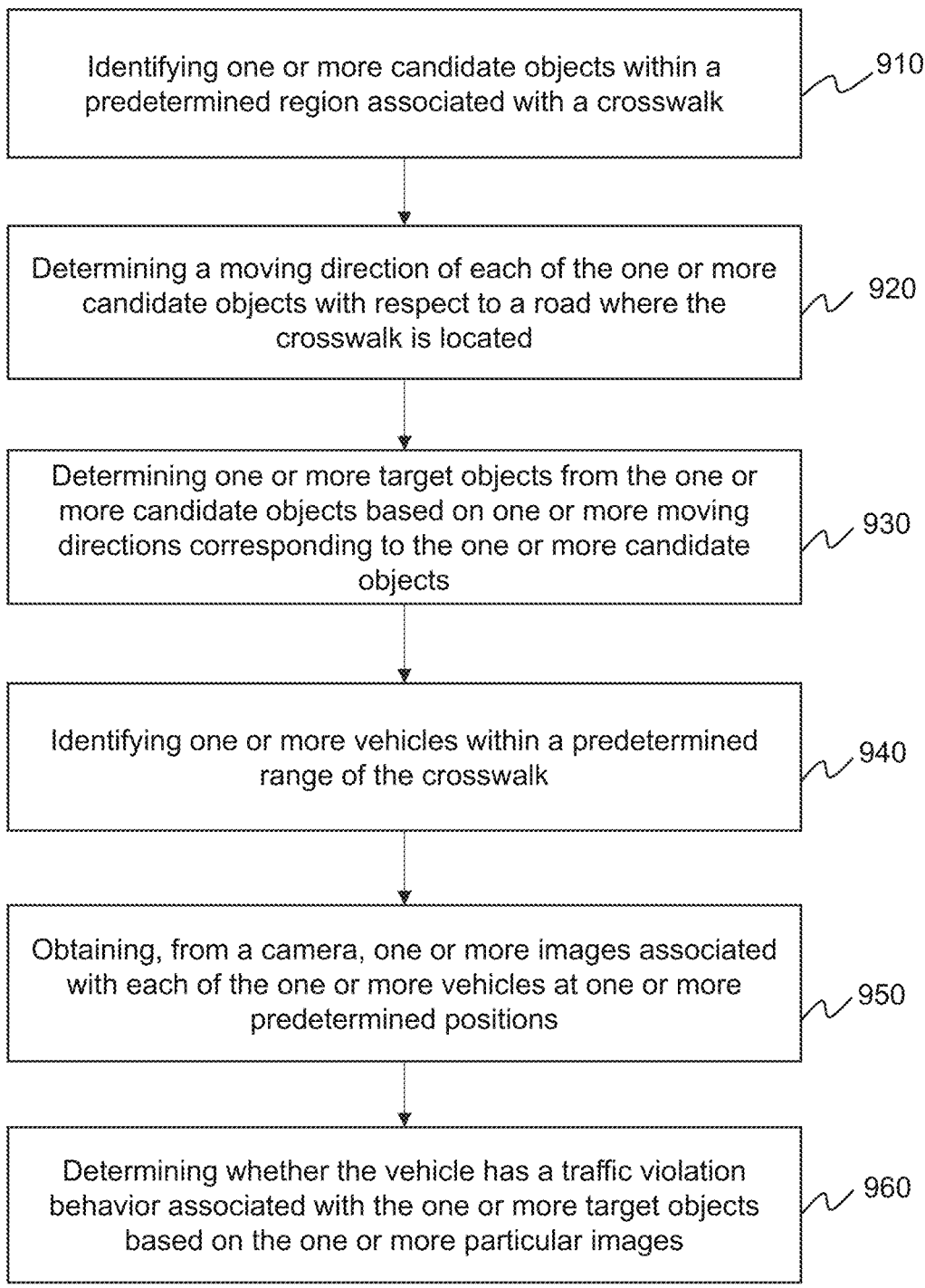
FIG. 9 is a flowchart illustrating an exemplary process for determining whether a vehicle has a traffic violation behavior according to some embodiments of the present disclosure.

FIG. 9 is a flowchart illustrating an exemplary process for determining whether a vehicle has a traffic violation behavior according to some embodiments of the present disclosure. In some embodiments, process 900 may be implemented as a set of instructions (e.g., an application) stored in a storage device (e.g., the storage device 150, the ROM 230 or RAM 240). The processor 220 and/or the modules in FIG. 8 may execute the set of instructions, and when executing the instructions, the processor 220 and/or the modules in FIG. 8 may be configured to perform the process 900. The operations of the illustrated process presented below are intended to be illustrative. In some embodiments, the process 900 may be accomplished with one or more additional operations not described and/or without one or more of the operations discussed. Additionally, the order in which the operations of the process 900 illustrated in FIG. 9 and described below is not intended to be limiting.

In 910, the processing device 112 (e.g., the identification module 810) may identify one or more candidate objects within a predetermined region associated with a crosswalk at a road.

As used herein, a candidate object refers to an object that is located in the predetermined region. For example, the candidate object may include a pedestrian (e.g., a person traveling on foot or by a wheelchair, a scooter, or a skateboard), a bicyclist, a driver of a non-motorized vehicle (e.g., a motorbike), or the like, or any combination thereof. The predetermined region associated with the crosswalk refers to a waiting region in which the candidate object(s) should stay to wait to cross the road. For example, the predetermined region may be a region including one or more zebra crossings at an end of the crosswalk.

In some embodiments, the processing device 112 may identify the one or more candidate objects from one or more images (or image frames of a video) including the one or more candidate objects captured by a camera (e.g., the image acquisition device 130). The camera may be a surveillance equipment mounted near the crosswalk configured to capture images of the crosswalk at regular or irregular intervals. Merely by way of example, the camera may capture the image(s) at a regular interval (e.g., each 0.1 seconds, 0.2 seconds, 0.3 seconds, 0.4 seconds, 0.5 seconds, 0.6 seconds, etc.).

In some embodiments, the processing device 112 may identify the one or more candidate objects according to an object detection algorithm (also referred to as a first object detection algorithm). Optionally, based on each of the image(s) of the candidate object(s), the processing device 112 may determine a position of the one or more candidate objects at the time point when the image of the candidate object(s) is captured. Exemplary first object detection algorithms may include a YOLO model (e.g., YOLO 1, YOLO 2, or YOLO 3), a region-convolutional neural network (R-CNN) algorithm, a scale normalization for image pyramids (SIPN) algorithm, a detection with enriched semantics (DES) algorithm, a scale-transferrable detection network (STDN) algorithm, a fast R-CNN algorithm, a faster R-CNN algorithm, a single shot multi-box detector (SSD) algorithm, or the like, or any combination thereof.

In some embodiments, for each of the one or more candidate objects, the processing device 112 may track the candidate object based on an image sequence that includes the candidate object using a target tracking algorithm. The image sequence of the candidate object may include a plurality of images including the candidate object sequentially captured by the camera as aforementioned. For example, the processing device 112 may determine a position of the candidate object based on each image in the image sequence of the candidate object, so as to determine a moving trajectory of the candidate object. Exemplary target tracking algorithms may include a kernelized correlation filters (KCF) algorithm, a multiple instance learning (MIL) algorithm, a minimum output sum of squared error (MOSSE) algorithm, a tracking-learning detection (TLD) algorithm, a structured output tracking with kernels (Struck) algorithm, a circulant structure of tracking-by-detection with kernels (CSK) algorithm, a hierarchical convolutional features (HCF) algorithm, a multi-domain convolutional neural networks (MDNet) algorithm, or the like, or any combination thereof.

In 920, the processing device 112 (e.g., the moving direction determination module 820) may determine a moving direction of each of the one or more candidate objects with respect to the road.

A moving direction of a candidate object with respect to the road may indicate a movement of the candidate object on the road. For example, the moving direction of the candidate object with respect to the road may include a direction away from the middle of the road (also referred to as a direction away from the road), a direction towards the middle of the road (also referred to as a direction crossing the road), a direction along the road (i.e., a direction parallel with the extension direction of the road), or the like.

In some embodiments, for a candidate object, the processing device 112 may determine a plurality of positions of the candidate object within the predetermined region based on a plurality of images including the candidate object. The plurality of images of the candidate object may be captured at a plurality of time points within a time interval after the candidate object enters the predetermined region. The processing device 112 may determine a plurality of intermediate moving directions of the candidate object based on the plurality of positions, wherein each of the plurality of intermediate moving directions may correspond to two adjacent positions of the plurality of positions. The processing device 112 may select one or more candidate intermediate moving directions satisfying a predetermined condition from the plurality of intermediate moving directions. The processing device 112 may determine the moving direction of the candidate object based at least in part on the plurality of candidate intermediate moving directions. More descriptions regarding the selection of the candidate intermediate moving directions may be found elsewhere in the present disclosure (e.g., FIG. 11 and the descriptions thereof).

In some embodiments, the processing device 112 may determine an initial position of the candidate object within the predetermined region based on an initial image of the candidate object captured at an initial time point. The processing device 112 may determine a preliminary moving direction of the candidate object based on the initial position of the candidate object. In some embodiments, the processing device 112 may determine a plurality of intermediate positions of the candidate object within the predetermined region based on a plurality of sequential images associated with the candidate object. The processing device 112 may further determine a plurality of intermediate moving directions of the candidate object based on a plurality of positions including the initial position and the plurality of intermediate positions. The processing device 112 may then determine the moving direction of the candidate object based at least in part on the plurality of intermediate moving directions. More descriptions regarding the determination of the moving direction of a candidate object may be found elsewhere in the present disclosure (e.g., FIG. 10 and the descriptions thereof).

In 930, the processing device 112 (e.g., the target object determination module 830) may determine one or more target objects from the one or more candidate objects based on one or more moving directions of the one or more candidate objects.

For example, for a candidate object, the processing device 112 may determine whether the moving direction of the candidate object is a direction away from the road or a direction crossing the road. In response to a determination that the moving direction is a direction crossing the road, the processing device 112 may designate the candidate object as a target object.

In some embodiments, in response to determining the one or more target objects, the processing device 112 may cause a signal device to generate a reminder signal. The reminder signal may be configured to remind a driver of a vehicle that is about to pass through the crosswalk to slow down (and/or stop), and/or remind the target object(s) to be careful. In some embodiments, the signal device may include a signal light, a display, a microphone, or the like, or any combination thereof. The reminder signal may include a light, a sound (e.g., a beep), a message, or the like, or any combination thereof. In some embodiments, in response to determining the one or more candidate objects, the processing device 112 may also cause the signal device to generate the reminder signal.

In some embodiments, in response to a determination that the moving direction of the candidate object is a direction away from the road, the processing device 112 may designate the candidate object as a negative object. Optionally, the processing device 112 may delete information associated with negative objects in traffic monitoring at a regular or irregular interval to reduce data computational burdens of the processing device 112. For example, the processing device 112 may delete information of negative objects at a regular interval (e.g., each 3 seconds, 5 seconds, 7 seconds, 10 seconds, 15 seconds, etc.). As another example, the processing device 112 may delete information of negative objects if a total amount of data is greater than a threshold (e.g., 70%, 75%, 80%, 85%, 90%, etc. of the capacity of a storage device that stores the data). Additionally or alternatively, the processing device 112 may delete information of a target object after the target object has passed the road.

In 940, the processing device 112 (e.g., the identification module 810) may identify one or more vehicles within a predetermined range of the crosswalk.

The predetermined range may include at least a portion of a region that can be captured of the camera. In some embodiments, the predetermined range may be set according to a default setting of the traffic monitoring system 100 or set manually by a user or operator via the terminal device 140.

In some embodiments, the processing device 112 may identify the one or more vehicles from a plurality of images of the vehicle(s) using a second object detection algorithm. The second object detection algorithm may be different from or the same as the first object detection algorithm. For example, the first object detection algorithm may be a YOLO 3 algorithm, and the second object detection algorithm may be an R-CNN algorithm. As another example, both the first object detection algorithm and the second object detection algorithm may be the YOLO 3 algorithm. The first object detection algorithm and the second object detection algorithm are merely provided for the purposes of illustration, and not intended to limit the scope of the present disclosure.

In 950, for each of the one or more vehicles, the processing device 112 (e.g., the traffic violation behavior determination module 840) may direct the camera to capture one or more images associated with the vehicle at one or more predetermined positions. For brevity, the one or more images associated with a vehicle at one or more predetermined positions are referred to as image(s) I. The one or more image(s) I may include one or more same or different images as the one or more images including the one or more candidate objects as described in connection with FIG. 9. In some embodiments, the one or more predetermined positions may be set according to a default setting of the traffic monitoring system 100 or set manually by a user or operator via the terminal device 140.

In some embodiments, the one or more predetermined positions may be defined by one or more lines in the predetermined range, each of which may be perpendicular to (or substantially perpendicular to) the crosswalk and have a distinctive position relative to the crosswalk. Merely by way of example, three predetermined positions may be defined by a first line, a second line, and a third line, each of which is within the predetermined range and perpendicular to the crosswalk. The first line may be within a first predetermined distance range of a side of a crosswalk area (e.g., a side where vehicles enter the crosswalk area). The second line may be within the crosswalk area. The third line may be within a third predetermined distance range of the other side of the crosswalk area (e.g., a side where vehicles exit the crosswalk area). As used herein, the crosswalk area refers to a walking region on which a moving object can walk to cross the road.

For example, as shown in FIG. 15, a solid box 1510 represents a crosswalk area where a pedestrian 1560 locates. Lines 1530, 1540, and 1550 represent the first line, the second line, and the third line, respectively. The camera may automatically capture a first image of the vehicle 1570 at the line 1530, a second image of the vehicle 1570 at the line 1540, and a third image of the vehicle 1570 at the line 1550. In some embodiments, the camera may capture images (e.g., a video) of the crosswalk area 1510 continuously or intermittently (e.g., periodically), and the first, second, and third images of the vehicle 1570 may be selected from the images by the processing device 112 or another computing device (e.g., a processor of the camera).

In some embodiments, for each of the one or more target objects, the processing device 112 may generate a binding relationship between each of the one or more vehicles and the target object. Optionally, the processing device 112 may generate a binding relationship between each of the one or more vehicles and each negative object as described in connection with operation 930. In some embodiments, a binding relationship between a candidate object (e.g., a target object or a negative object) and a vehicle may be generated by assigning an attribute value to the candidate object. The attribute value assigned to the target object may indicate a type of the candidate object with respect to the vehicle, for example, being a target object or a negative object. Optionally, the processing device 112 may update the binding relationship in real-time or periodically. For example, if it is determined that a candidate object moving away from the road (i.e., a negative object) changes its moving direction and intends to cross the road (i.e., changes into a target object), the processing device 112 may update the attribute value of the candidate object.

In some embodiments, the processing device 112 may generate an ID for each binding relationship between a candidate object and a vehicle. The processing device 112 may obtain the one or more images I of the vehicle according to the corresponding ID and the corresponding attribute value of the candidate object (e.g., a target or negative object). For example, if the candidate object is the target object, and at least a portion of the vehicle is at the first line, the second line, or the third line, the processing device 112 may direct the camera to capture the one or more image(s) I. As another example, the camera may capture images (e.g., a video) of the vehicle continuously or intermittently (e.g., periodically), and a first particular image, a second particular image, and a third particular image of the vehicle may be selected from the images of the vehicle by the processing device 112 or another computing device (e.g., a processor of the camera).

In some embodiments, the camera may transmit the image(s) I corresponding to the binding relationship with a specific ID to a storage device (e.g., the storage device 150), a terminal device (e.g., the terminal device 140), etc. A user may query the image(s) I based on the specific ID.

In 960, for each of the one or more vehicles, the processing device 112 (e.g., the traffic violation behavior determination module 840) may determine whether the vehicle has a traffic violation behavior associated with the one or more target objects based on the one or more images.

In some embodiments, for a vehicle, the processing device 112 may determine whether one or more images I associated with the vehicle are captured within a first predetermined time period. The first predetermined time period may be set according to a default setting of the traffic monitoring system 100 or set manually by a user or operator via the terminal device 140. In response to a determination that the one or more images I associated with the vehicle are captured within the first predetermined time period, the processing device 112 may determine that the vehicle has a traffic violation behavior associated with the one or more target objects. For example, a first image I of the vehicle at the first line, a second image I of the vehicle at the second line, and a third image I of the vehicle at the third line may be sequentially captured within the first predetermined time period, which suggests that the vehicle passes through the crosswalk without stopping for the one or more target objects. In such cases, the processing device 112 may determine that the vehicle has a traffic violation behavior associated with the one or more target objects and is deemed as a target vehicle.

In some embodiments, if the one or more images I of a vehicle are captured within the first predetermined time period, the processing device 112 may further verify whether the target object gets into the vehicle. Merely by way of example, based on the one or more images I associated with the vehicle, the processing device 112 may determine whether a door of the vehicle is open and whether at least one of the one or more target objects disappears within a second predetermined time period. The second predetermined time period may be set according to a default setting of the traffic monitoring system 100 or set manually by a user or operator via the terminal device 140. The second predetermined time period may be the same as or different from the first predetermined time period. For example, the second predetermined time period may be longer than the first predetermined time period. If the door of the vehicle is open and the at least one of the one or more target objects disappears, the processing device 112 may speculate that the at least one target object gets on the vehicle, and determine that the vehicle does not have the traffic violation behavior associated with the one or more target objects. More descriptions for determining whether a vehicle has a traffic violation behavior may be found elsewhere in the present disclosure (e.g., FIG. 14 and the descriptions thereof).

In some embodiments, when it is determined that a vehicle has the traffic violation behavior associated with the one or more target objects, the processing device 112 may perform one or more additional operations with respect to the vehicle. The additional operation(s) may include, for example, making a state of the vehicle as a violation state, detecting a license plate, a speed, a window, a face, a driving behavior associated with the vehicle based on the one or more images I associated with the vehicle, or the like, or any combination thereof. Optionally, the processing device 112 may compare a result of an additional operation with information in one or more databases. For example, the processing device 112 may determine face information of the driver of the vehicle by analyzing the image(s) I associated with the vehicle, and compare the face information with information in a driver database, so as to obtain profile information of the driver. As another example, the processing device 112 may determine license plate information of the vehicle by analyzing the image(s) I associated with the vehicle, and compare the license plate information of the vehicle with information in a vehicle database, so as to obtain vehicle and/or driver information.

In some embodiments, the processing device 112 may transmit a processing result regarding a vehicle (e.g., a determination result as to whether the vehicle has a traffic violation behavior, a result of an additional operation) to a user device (e.g., the terminal device 140) or a storage device (e.g., the storage device 150). For example, the processing result may be transmitted to a terminal device or a storage device of a traffic management department, a traffic data center, an alarm center, the terminal device 140 or the like, or any combination thereof.

It should be noted that the above descriptions are merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations (e.g., a storing operation) may be added elsewhere in the process 900, and/or one or more operations described above may be omitted. In the storing operation, the processing device 112 may store information and/or data (e.g., the predetermined region, the one or more images associated with a vehicle, etc.) associated with the traffic monitoring system 100 in a storage device (e.g., the storage device 150) disclosed elsewhere in the present disclosure. As another example, operation 920 and operation 930 may be combined into a single operation in which the processing device 112 may both determine the moving direction of each of the one or more candidate objects and determine the one or more target objects.

Figure 10:
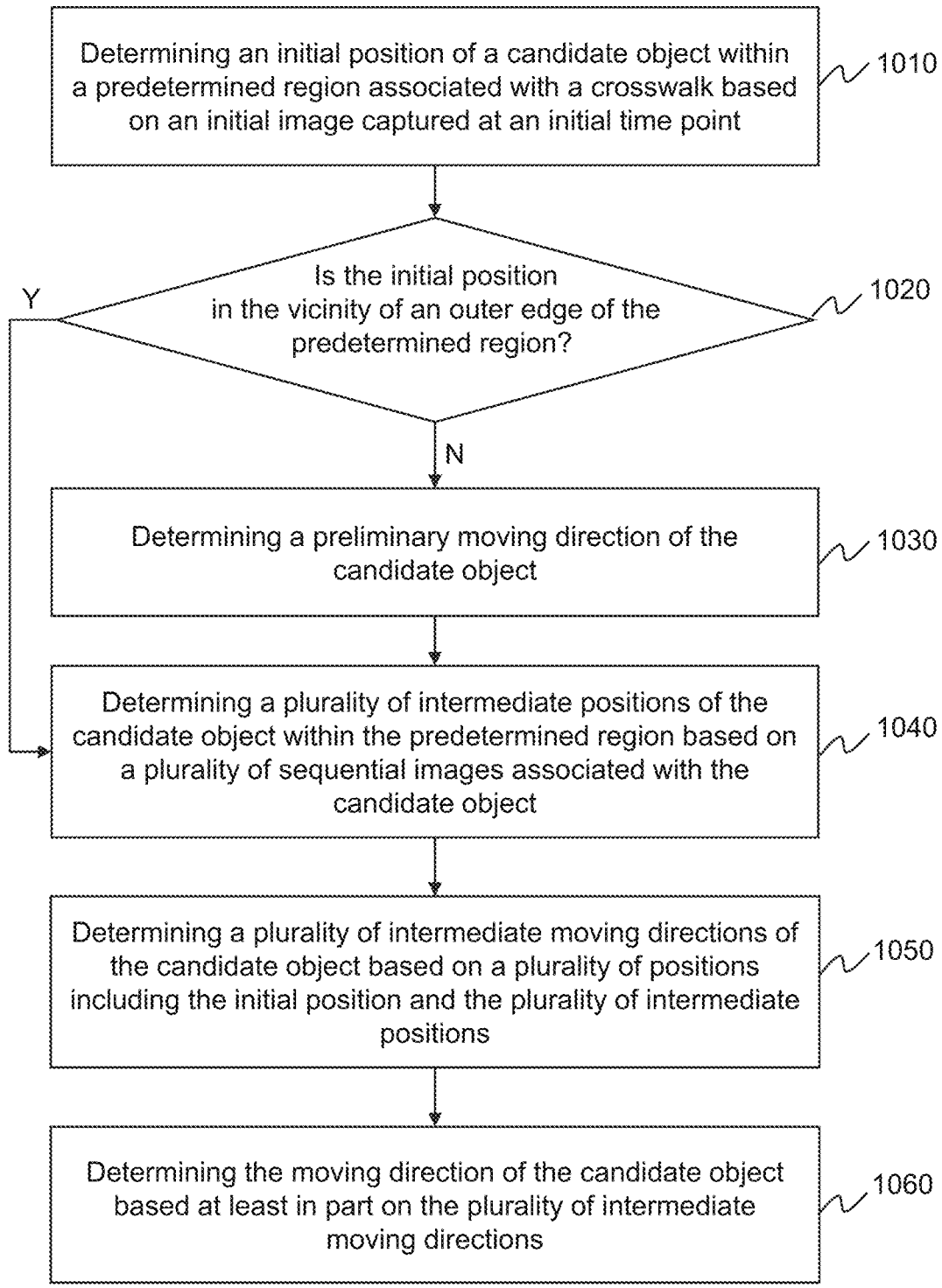
FIG. 10 is a flowchart illustrating an exemplary process for determining a moving direction of a candidate object with respect to a road according to some embodiments of the present disclosure.

FIG. 10 is a flowchart illustrating an exemplary process for determining a moving direction of a candidate object with respect to a road according to some embodiments of the present disclosure. In some embodiments, process 1000 may be implemented as a set of instructions (e.g., an application) stored in a storage device (e.g., the storage device 150, the ROM 230 or RAM 240). The processing device 112 (e.g., the processor 220, the modules in FIG. 8) may execute the set of instructions, and when executing the instructions, the processing device 112 may be configured to perform the process 1000. The operations of the illustrated process presented below are intended to be illustrative. In some embodiments, the process 1000 may be accomplished with one or more additional operations not described and/or without one or more of the operations discussed. Additionally, the order in which the operations of the process 1000 illustrated in FIG. 10 and described below is not intended to be limiting. In some embodiments, one or more operations of the process 1000 may be performed to achieve at least part of operation 920 as described in connection with FIG. 9. For example, for each of the one or more candidate objects as described in connection with 920, the process 1000 may be performed to determine the moving direction of the candidate object with respect to a road.

In 1010, the processing device 112 (e.g., the moving direction determination module 820) may determine an initial position of the candidate object within a predetermined region associated with a crosswalk based on an initial image captured at an initial time point. The predetermined region may be a waiting region at a road where the crosswalk is located as described in elsewhere of the present disclosure (e.g., FIG. 4 and FIG. 9 and the descriptions thereof).

As used herein, the initial image captured at the initial time point refers to the first image that is captured by a camera and includes the candidate object after the candidate object enters the predetermined region. For example, if the camera captures an image every 0.2 seconds and the candidate object enters the predetermined region at 10:00, the initial image may be captured at 0.2 seconds after 10:00. The initial position of the candidate object may be a position of the candidate object at 0.2 seconds after 10:00.

In 1020, the processing device 112 (e.g., the moving direction determination module 820) may determine whether the initial position of the candidate object is in the vicinity of an outer edge of the predetermined region.

As used herein, the outer edge of the predetermined region refers to an edge of the predetermined region that is further from the centerline of the road than any other edge (e.g., an inner edge) of the predetermined region. A candidate object may be regarded as being in the vicinity of the outer edge of the predetermined region if, for example, its distance to the outer edge is smaller than its distance to an edge opposite to the outer edge. For example, the predetermined region may be a quadrilateral waiting area on the left side of the road. The left side of the predetermined region may be further from the centerline of the road than any other sides, and regarded as an outer edge of the predetermined region. If a distance between a candidate object and the left side is smaller than a distance between the candidate object and the right side of the predetermined region, the candidate object may be regarded as being in the vicinity of the outer edge of the predetermined region.

In response to a determination that the initial position is in the vicinity of the outer edge of the predetermined region, the process 1000 may proceed to operation 1040. In response to a determination that the initial position is not in the vicinity of the outer edge of the predetermined region, the process 1000 may proceed to operation 1030.

In 1030, the processing device 112 (e.g., the moving direction determination module 820) may determine a preliminary moving direction of the candidate object. For example, the preliminary moving direction may be a direction away from the road.

In 1040, the processing device 112 (e.g., the moving direction determination module 820) may determine a plurality of intermediate positions of the candidate object within the predetermined region based on a plurality of sequential images associated with the candidate object. The plurality of sequential images may be sequentially captured by the camera at a plurality of intermediate time points immediately after the initial time point. Each of the plurality of intermediate time points may correspond to an intermediate position of the candidate object. The plurality of sequential images may be images captured within a predetermined time period, such as 1 second, 1.5 seconds, 2 seconds, 2.5 seconds, etc. For example, the camera may capture an image every 0.2 seconds within 2 seconds after the initial time point, thereby generating 10 images.

In 1050, the processing device 112 (e.g., the moving direction determination module 820) may determine a plurality of intermediate moving directions of the candidate object based on a plurality of positions including the initial position and the plurality of intermediate positions. Each of the plurality of intermediate moving directions may correspond to two adjacent positions of the plurality of positions. For example, each pair of adjacent positions of the positions may include a first position corresponding to an earlier time point and a second position corresponding to a later time point. For each pair of adjacent positions, the processing device 112 may determine a direction from the first position to the second position as the intermediate moving direction corresponding to the pair of adjacent positions.

In 1060, the processing device 112 (e.g., the moving direction determination module 820) may determine the moving direction of the candidate object based at least in part on the plurality of intermediate moving directions.

In some embodiments, the processing device 112 may select one or more candidate intermediate moving directions satisfying a predetermined condition from the plurality of intermediate moving directions. For example, an intermediate moving direction may be selected as a candidate intermediate moving direction if an angle between the intermediate moving direction and a certain direction (e.g. a direction as denoted by an arrow N in FIG. 13) is less than a threshold angle, such as 50°, 45°, 40°, 35°, 25°, 15°, etc. More descriptions regarding selecting a candidate intermediate moving direction may be found elsewhere in the present disclosure (e.g., FIG. 11 and the descriptions thereof).

For each of the candidate intermediate moving direction(s), the processing device 112 may classify the candidate intermediate moving direction as a target moving direction crossing the road or a negative moving direction away from the road. For example, the predetermined region may be on the left side of the road. If for a certain pair of adjacent positions, the second position is on the right side of the first position, the processing device 112 may determine the candidate intermediate moving direction as the target moving direction crossing the road. If the second position is on the left side of the first position, the processing device 112 may determine the candidate intermediate moving direction as the negative moving direction away from the road.

In some embodiments, the processing device 112 may determine the moving direction of the candidate object based on a classification result of the candidate intermediate moving directions (i.e., the target moving direction(s) and the negative moving direction(s)). For example, the processing device 112 may determine a first count of target moving directions and a second count of negative moving directions, and designate a direction corresponding to the larger count among the first and second counts as the moving direction of the candidate object. As another example, a first value (e.g., 1) may be assigned to a target moving direction and a second value (e.g., 0) may be assigned to a negative moving direction. The processing device 112 may determine a weighted average value of the all candidate intermediate moving direction(s). The processing device 112 may determine a direction crossing the road as the moving direction of the candidate object if the weighted average value is greater than a threshold value. In some embodiments, the classification result of the candidate intermediate moving directions may also refer to an average moving direction of the candidate intermediate moving directions.

In some embodiments, if it is determined that the initial position of the candidate object is not in the vicinity of an outer edge of the predetermined region, the processing device 112 may determine the moving direction of the candidate object based on the intermediate moving directions and the preliminary moving direction in a similar manner as how the moving direction is determined based on the intermediate moving directions as aforementioned.

It should be noted that the above descriptions are merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, one or more operations may be omitted and/or one or more additional operations may be added. For example, operations 1010, 1020 and 1030 may be omitted. Additionally or alternatively, two or more operations may be integrated into a single operation. For example, operation 1040 and operation 1050 may be combined into a single operation.

Figure 11:
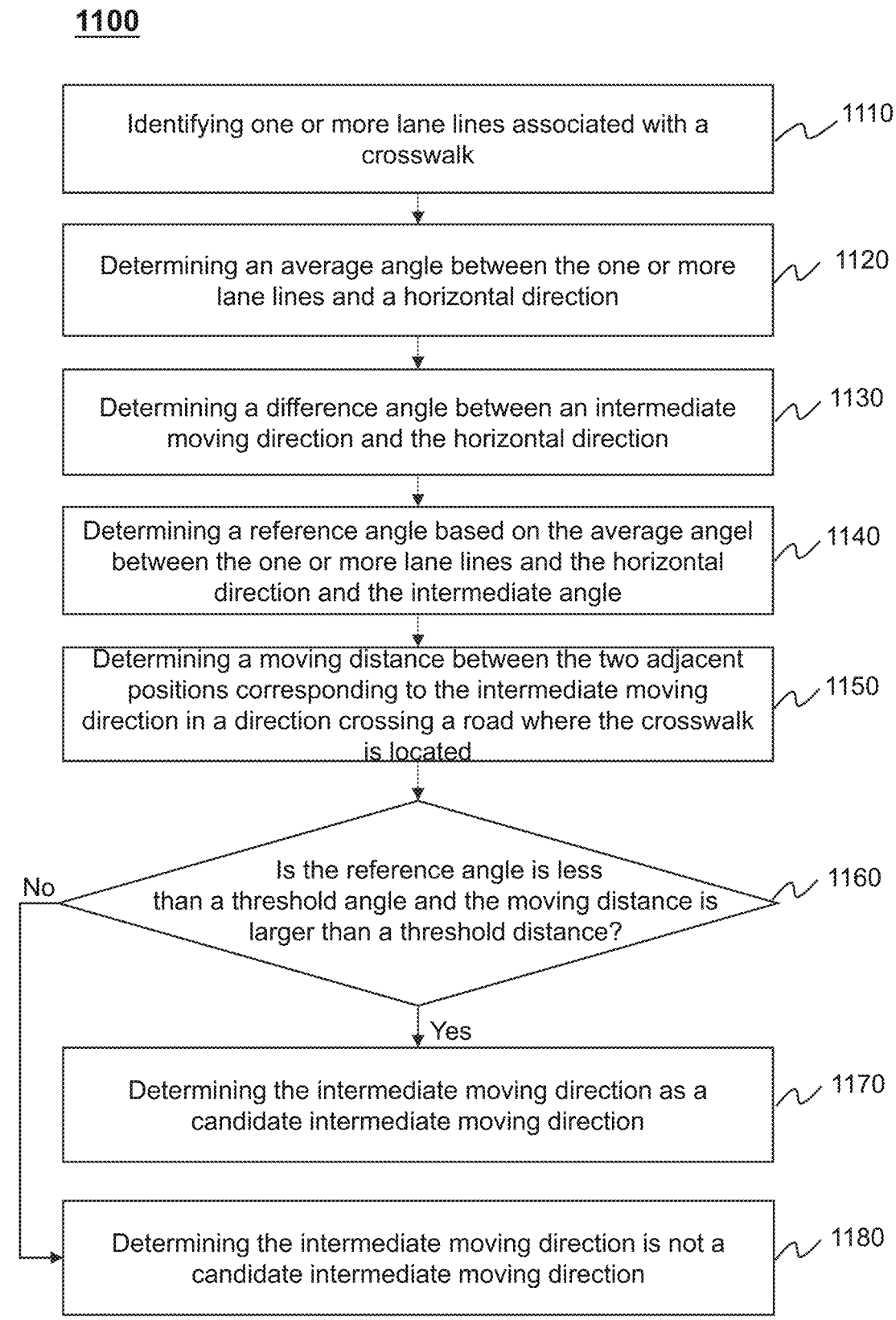
FIG. 11 is a flowchart illustrating an exemplary process for selecting a candidate intermediate moving direction according to some embodiments of the present disclosure.

FIG. 11 is a flowchart illustrating an exemplary process for selecting a candidate intermediate moving direction according to some embodiments of the present disclosure. In some embodiments, process 1100 may be implemented as a set of instructions (e.g., an application) stored in a storage device (e.g., the storage device 150, the ROM 230 or RAM 240). The processor 220 and/or the modules in FIG. 8 may execute the set of instructions, and when executing the instructions, the processor 220 and/or the modules in FIG. 8 may be configured to perform the process 1100. The operations of the illustrated process presented below are intended to be illustrative. In some embodiments, the process 1100 may be accomplished with one or more additional operations not described and/or without one or more of the operations discussed. Additionally, the order in which the operations of the process 1100 illustrated in FIG. 11 and described below is not intended to be limiting.

In some embodiments, the candidate intermediate moving direction described elsewhere in the present disclosure (e.g., operation 920 in FIG. 9 and operation 1060 in FIG. 10) may be selected from the intermediate moving directions by performing the process 1100. For example, for each of the intermediate moving directions as described in connection with operation 1060, the process 1100 may be performed to determine whether the intermediate moving direction can be selected as a candidate intermediate moving direction.

In 1110, the processing device 112 (e.g., the identification module 810) may identify one or more lane lines associated with a crosswalk. The processing device 112 may identify the one or more lane lines based on an image of a candidate object including the crosswalk captured by a camera (e.g., the image acquisition device 130).

In some embodiments, the processing device 112 may identify the one or more lane lines using a lane line detection algorithm. Exemplary lane line detection algorithms may include a LaneNet model, a spatial convolution neural network (SCNN), a vanishing point guided network (VPG-NET), or the like. In some embodiments, the one or more lane lines may be determined manually. For example, a user or operator may mark the lane line(s) from the image via a user interface of a terminal (e.g., the terminal device 140).

In 1120, the processing device 112 (e.g., the moving direction determination module 820) may determine an average angle between the one or more lane lines and a horizontal direction of the image of the candidate object. The processing device 112 may determine an angle between each of the one or more lane lines and the horizontal direction. The processing device 112 may further determine the average angle based on the angle(s) between the one or more lane lines and the horizontal direction. For example, as shown in FIG. 12, the horizontal direction may be a direction as indicated by an arrow A, angles between lane lines 1212, 1214, and 1216 and the horizontal direction may be denoted as $\alpha 1$, $\alpha 2$, and $\alpha 3$, respectively. An average angle $\alpha$ may be determined as $(\alpha_1+\alpha_2+\alpha_3)/3$.

In 1120, the processing device 112 (e.g., the moving direction determination module 820) may determine an angle between an intermediate moving direction of the candidate object and the horizontal direction of the image of the candidate object. The intermediate moving direction of the candidate object may correspond to two adjacent positions of a plurality of positions as described in connection with operation 1050 in FIG. 10.

For example, the intermediate moving direction may be determined based on a pair of adjacent positions including a first position (x1, y1) corresponding to an earlier time point and a second position (x2, y2) corresponding to a later time point. The processing device 112 may determine a first displacement $\Delta x$ in the horizontal direction as $\Delta x=x2-x1$, and a second displacement $\Delta y$ in the vertical direction as $\Delta y=y2-y1$. The processing device 112 may determine an angle between the intermediate moving direction and the horizontal direction as $\arctan(\Delta y/\Delta x)$, such as an angle $\theta$ in FIG. 13.

In 1140, the processing device 112 (e.g., the moving direction determination module 820) may determine a reference angle based on the average angel between the one or more lane lines and the horizontal direction and the angle between the intermediate moving direction and the horizontal direction. For example, the processing device 112 may determine the reference angle as $|\alpha-\beta-\arctan(\Delta y/\Delta x)|$, wherein $\beta$ represents a predetermined angle. The predetermined angle $\beta$ may be set according to a default setting of the traffic monitoring system 100 or by a user manually via the terminal device 140. For example, the $\beta$ may be equal to one of 85°, 87°, 89°, 90°, 92°, etc.

In 1150, the processing device 112 (e.g., the moving direction determination module 820) may determine a moving distance between the two adjacent positions corresponding to the intermediate moving direction in a direction crossing a road where the crosswalk is located (e.g., a direction as denoted by an arrow N in FIG. 13). For example, the processing device 112 may determine the moving distance between the first position (x1, y1) and the second position (x2, y2) as $|\Delta x \times \cos(\alpha-\beta)|$. In some embodiments, the moving distance may be an actual distance in the physical space or a pixel distance in an image.

In 1160, the processing device 112 (e.g., the moving direction determination module 820) may determine whether the reference angle is less than a threshold angle and whether the moving distance is larger than a threshold distance.

In some embodiments, the threshold angle and/or the threshold distance may be determined by the processing device 112 (or another computing device) according to different scenarios. For example, the threshold angle may be associated with an orientation of the camera when capturing images, a field of view (FOV) of the camera, a distance between the camera and the candidate object, etc. As another example, the threshold distance may be associated with a resolution of the camera. In some embodiments, the threshold distance may be a threshold pixel distance denoted by a count of pixels. For example, the threshold pixel distance may correspond to a certain distance (e.g., 0.1 m, 0.2 m, 0.4 m, 0.6 m, 0.8 m, 1 m, etc.) in the physical space. The certain distance may correspond to a greater threshold pixel distance if the camera has a higher resolution. In some embodiments, the threshold angle and/or the threshold distance may be a default setting of the processing device 112 or set by a user via the terminal device 140. For example, the threshold angle may be set as one of 15°, 25°, 35°, 40°, 45°, etc. As another example, the threshold distance may be set as one of 30 pixels, 40 pixels, 50 pixels, 60 pixels, etc.

In response to a determination that the reference angle is less than the threshold angle (i.e., the first position and the second position satisfies Equation (1) as described in FIG. 4) and the moving distance is larger than the threshold distance (i.e., the first position and the second position satisfies Equation (2) as described in FIG. 4), the processing device 112 may determine the intermediate moving direction as a candidate intermediate moving direction in 1170.

In response to a determination that the first position and the second position do not satisfy Equation (1) or Equation (2), the processing device 112 may determine the intermediate moving direction is not a candidate intermediate moving direction in 1180. By selecting the candidate intermediate moving direction(s) and determining the moving direction of the candidate object based on the candidate intermediate moving direction(s), the accuracy and reliability of the determined moving direction may be improved. For example, an intermediate moving direction whose reference angle is greater than the threshold angle (e.g., an intermediate moving direction that is along the extension direction of the road) may be removed. As another example, if the moving distance corresponding to the intermediate moving direction is shorter than a threshold distance and greater than 0, it may suggest that the camera has a vibration and the intermediate moving direction may be removed. Removing such an intermediate moving direction may reduce or eliminate the effect of equipment error and improve the determination accuracy.

It should be noted that the above descriptions are merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations (e.g., a storing operation) may be added or one or more operations described above may be omitted. As another example, operation 1150 may be omitted, and the processing device 112 may determine whether the intermediate moving direction is a candidate intermediate moving direction solely based on the reference angle. As yet another example, the order of the operations may be modified.

FIG. 12 is a schematic diagram illustrating exemplary angles between lane lines and a horizontal direction according to some embodiments of the present disclosure. As shown in FIG. 12, lines 1212, 1214, and 1216 represent three lane lines on a road. Line 1220 represents a line along the horizontal direction denoted by an arrow A. $\alpha 1$, $\alpha 2$, and $\alpha 3$ represent to angles between the three lane lines (i.e., lines 1212, 1214, and 1216) and the horizontal direction, respectively. An average angle $\alpha$ between the three lane lines and the horizontal direction may be determined as $(\alpha_1+\alpha_2+\alpha_3)/3$.

FIG. 13 is a schematic diagram illustrating an exemplary process for determining a candidate intermediate moving direction corresponding to two adjacent positions according to some embodiments of the present disclosure. As shown in FIG. 13, lines 1332, 1334, and 1336 represent three lane lines on a road that includes a crosswalk. An X-axis represents the horizontal direction of an image including the crosswalk and a Y-axis represents the vertical direction of the image. A first point 1310 represents a first position (x1, y1) of a candidate object within a predetermined region (i.e., a region denoted by a dashed box 1340) of the crosswalk at a first time point. A second point 1320 represents a second position (x2, y2) of the candidate object within the predetermined region at a second time point after the first time point. The first position and the second position may be regarded as two adjacent positions of the candidate object.

A direction (denoted as an arrow M) from the first point 1310 to the second point 1320 may be determined as an intermediate moving direction of the candidate object. An angle between the intermediate moving direction and the horizontal direction of the image is denoted as an angle $\theta$.

In some embodiments, an average angle $\alpha$ between the three lane lines 1332, 1334, and 1336 and the horizontal direction may be determined. The crosswalk (i.e., a direction denoted as arrow N) is perpendicular to the three lane lines, that is, an angle $\varepsilon$ as shown in FIG. 13 is equal to 90°. Assuming that a predetermined angle $\beta$ is 90°, a reference angle (i.e., $|\alpha-90°-\arctan(\Delta y/\Delta x)|$) between the intermediate moving direction (i.e., the arrow M) and the horizontal direction (i.e., the X-axis) may be determined as an angle $\delta$. A moving distance (i.e., $|\Delta x \times \cos(\alpha-90°)|$) between the first position and the second position in a direction crossing the road (e.g., a direction as denoted by an arrow N) may be determined as a distance $\Delta s$. Then, the angle $\delta$ may be compared with a threshold angle and the distance $\Delta s$ may be compared with a threshold distance to determine whether the intermediate moving direction is a candidate intermediate moving direction.

Figure 14:
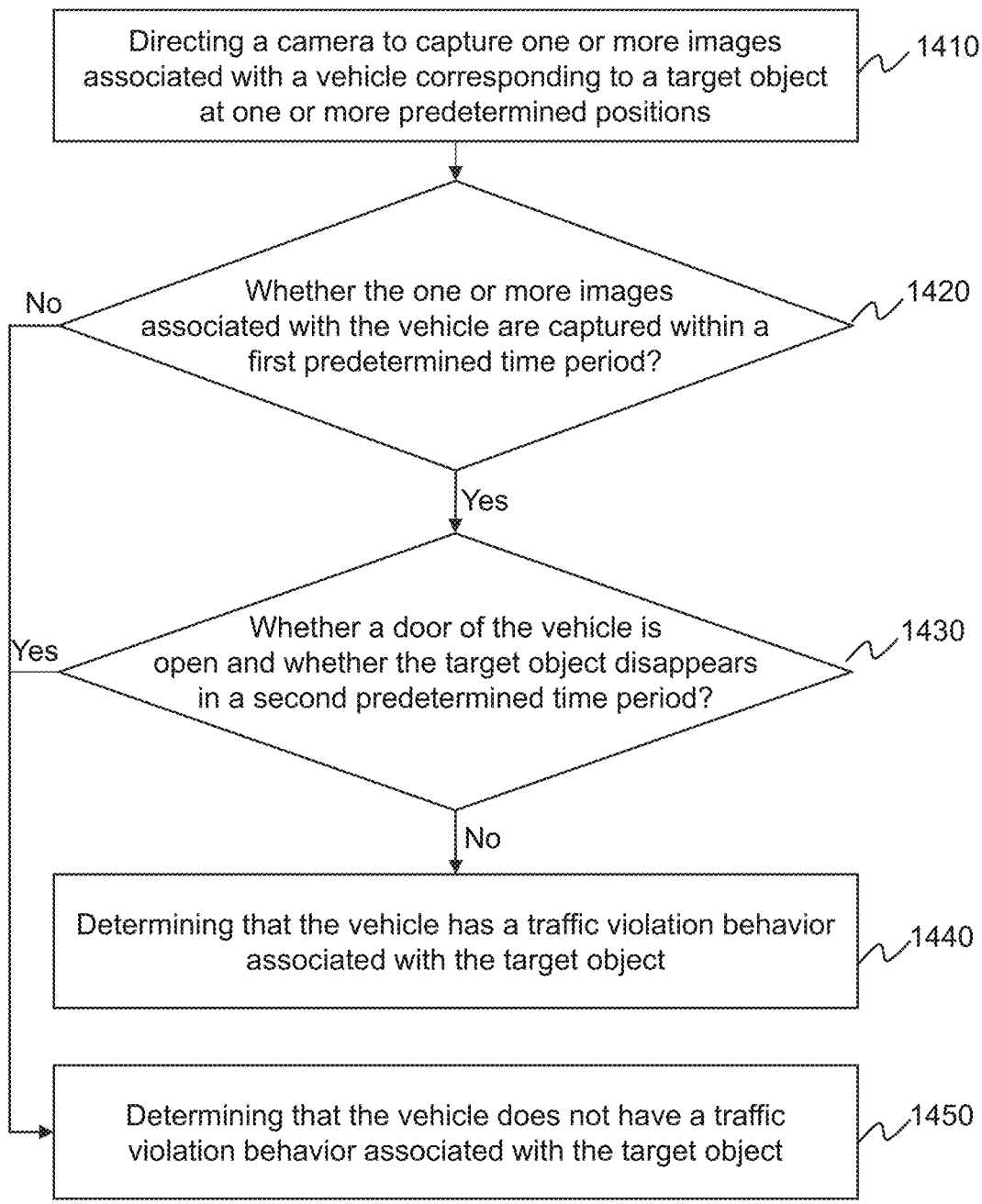
FIG. 14 is a flowchart illustrating an exemplary process for determining whether a vehicle has a traffic violation behavior according to some embodiments of the present disclosure.

FIG. 14 is a flowchart illustrating an exemplary process for determining whether a vehicle has a traffic violation behavior according to some embodiments of the present disclosure. In some embodiments, process 1400 may be implemented as a set of instructions (e.g., an application) stored in a storage device (e.g., the storage device 150, the ROM 230 or RAM 240). The processor 220 and/or the modules in FIG. 8 may execute the set of instructions, and when executing the instructions, the processor 220 and/or the modules in FIG. 8 may be configured to perform the process 1400. The operations of the illustrated process presented below are intended to be illustrative. In some embodiments, the process 1400 may be accomplished with one or more additional operations not described and/or without one or more of the operations discussed. Additionally, the order in which the operations of the process 1400 illustrated in FIG. 14 and described below is not intended to be limiting. In some embodiments, one or more operations of the process 1400 may be performed to achieve at least part of operation 960 as described in connection with FIG. 9. For example, for each of the one or more vehicles as described in connection with operation 960, the process 1400 may be performed to determine whether the vehicle has a traffic violation behavior.

In 1410, the processing device 112 (e.g., the traffic violation behavior determination module 840) may direct a camera to capture one or more images I associated with a vehicle corresponding to a target object at one or more predetermined positions.

In some embodiments, the one or more predetermined positions may be associated with a crosswalk area of a crosswalk. For example, the one or more predetermined positions may be defined by one or more lines in the predetermined range, each of which may be perpendicular to (or substantially perpendicular to) the crosswalk and have a distinctive position relative to the crosswalk. Merely by way of example, three predetermined positions may be defined by a first line, a second line, and a third line, each of which is within the predetermined range and perpendicular to the crosswalk. The first line may be within a first predetermined distance range of a side of a crosswalk area (e.g., a side where vehicles enter the crosswalk area). The second line may be within the crosswalk area. The third line may be within a third predetermined distance range of the other side of the crosswalk area (e.g., a side where vehicles exit the crosswalk area). The target object may be an object in a predetermined region associated with the crosswalk whose moving direction is a direction crossing a road where the crosswalk is located.

In 1420, the processing device 112 (e.g., the traffic violation behavior determination module 840) may determine whether the one or more images I associated with the vehicle are captured within a first predetermined time period. In some embodiments, the first predetermined time period may be a default setting of the processing device 112 or set manually by a user or operator via the terminal device 140.

In response to a determination that the one or more images I associated with the vehicle are captured within the first predetermined time period, the process 1400 may proceed to operation 1430. In response to a determination that the one or more images I associated with the vehicle are not captured within the first predetermined time period, the process 1400 may proceed to operation 1450, in which processing device 112 may determine that the vehicle does not have a traffic violation behavior associated with the target object.

In 1430, the processing device 112 (e.g., the traffic violation behavior determination module 840) may determine whether a door of the vehicle is open and whether the target object disappears in a second predetermined time period based on the one or more images I associated with the vehicle.

In some embodiments, the processing device 112 may determine a count/number of lanes between the vehicle and the target object. For example, the processing device 112 may determine a distance between the vehicle and the target object in a direction that the target object crossing the road (e.g., a direction as denoted by an arrow N in FIG. 13). The processing device 112 may determine the count/number of lanes between the vehicle and the target object based on the distance. If the count/number of lanes is equal to 0, the processing device 112 may determine whether the door of the vehicle is open and whether the target object disappears in the second predetermined time period. If the count/number of lanes is greater than 0, the processing device 112 may determine that the door of the vehicle is close and/or the target object does not disappear in the second predetermined time period.

In response to a determination that the door of the vehicle is open and the target object disappears in the second predetermined time period (which suggests that the target object gets into the target vehicle), the process 1400 may proceed to 1450, in which the processing device 112 may determine that the vehicle does not have a traffic violation behavior associated with the target object. In response to a determination that the door of the vehicle is closed or the target object does not disappear in the second predetermined time period, the process 1400 may proceed to 1440, in which the processing device 112 may determine that the vehicle has a traffic violation behavior associated with the target object.

It should be noted that the above descriptions are merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the processing device 112 may determine that the target object gets into the target vehicle based on any other technique, such as an object detection technique (e.g., using a region convolutional neural network (R-CNN) algorithm). As another example, one or more other optional operations (e.g., a storing operation) may be added elsewhere in the process 1400. In the storing operation, the processing device 112 may store information and/or data (e.g., the one or more images I associated with the vehicle, the predetermined positions, information about the behavior of the vehicle, etc.) associated with the traffic monitoring system 100 in a storage device (e.g., the storage device 150) disclosed elsewhere in the present disclosure. As another example, operation 1430 may be omitted.

FIG. 15 illustrates an exemplary image associated with a vehicle at a predetermined position captured by a camera according to some embodiments of the present disclosure. As illustrated in FIG. 15, a solid box 1510 represents a crosswalk area associated with a crosswalk. Dotted boxes 1522 and 1524 represent to two predetermined regions at two ends of the crosswalk, i.e., two waiting regions of the crosswalk. A driver 1560 of a non-motorized vehicle is waiting to cross the crosswalk at the predetermined region 1522.

Lines 1530, 1540, and 1550 represent three lines perpendicular to the crosswalk. The line 1530 is located within a first predetermined distance range of a side of the crosswalk area where the vehicle enters the crosswalk area 1510; the line 1540 is within the crosswalk area 1510; the line 1550 is within a third predetermined distance range of the other side of the crosswalk area where the vehicle exits the crosswalk area 1510. According to FIG. 15, the vehicle 1570 passes through the crosswalk without stopping for the driver 1560, thereby having a traffic violation behavior associated with the driver 1560.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer readable program code embodied thereon.

A non-transitory computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran, Perl, COBOL, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A system, comprising:
   at least one storage device storing executable instructions, and
   at least one processor in communication with the at least one storage device, wherein when executing the executable instructions, the at least one processor is directed to cause the system to perform operations including:
   identifying one or more candidate objects within a predetermined region associated with a crosswalk at a road from one or more first images of the crosswalk captured by a surveillance equipment mounted near the crosswalk;
   for each of the one or more candidate objects, determining a moving direction of the candidate object with respect to the road;
   determining one or more target objects from the one or more candidate objects based on one or more moving directions corresponding to the one or more candidate objects;
   identifying one or more vehicles within a predetermined range of the crosswalk; and
   for each of the one or more vehicles,
   obtaining, from the surveillance equipment mounted near the crosswalk, one or more second images including the vehicle at one or more predetermined positions; and
   determining whether the vehicle has a traffic violation behavior associated with the one or more target objects based on the one or more second images.

2. The system of claim 1, wherein for each of the one or more candidate objects, the determining the moving direction of the candidate object with respect to the road includes:
   determining an initial position of the candidate object within the predetermined region based on an initial image captured at an initial time point;
   determining whether the initial position of the candidate object is in the vicinity of an outer edge of the predetermined region;
   in response to a determination that the initial position is in the vicinity of the outer edge of the predetermined region,
   determining a plurality of intermediate positions of the candidate object within the predetermined region based on a plurality of sequential images associated with the candidate object, the plurality of sequential images being sequentially captured at a plurality of intermediate time points immediately after the initial time point;
   determining a plurality of intermediate moving directions of the candidate object based on a plurality of positions including the initial position and the plurality of intermediate positions, wherein each of the plurality of intermediate moving directions corresponds to two adjacent positions of the plurality of positions; and
   determining the moving direction of the candidate object based at least in part on the plurality of intermediate moving directions.

3. The system of claim 2, wherein the determining the moving direction of the candidate object based at least in part on the plurality of intermediate moving directions includes:
   selecting candidate intermediate moving directions satisfying a predetermined condition from the plurality of intermediate moving directions; and
   determining the moving direction of the candidate object based on the candidate intermediate moving directions.

4. The system of claim 3, wherein the selecting the candidate intermediate moving directions satisfying the predetermined condition from the plurality of intermediate moving directions includes:
   identifying one or more lane lines associated with the crosswalk;
   determining an average angle between the one or more lane lines and a horizontal direction;
   for each of the plurality of intermediate moving positions,
   determining an angle between the intermediate moving direction and the horizontal direction;
   determining a reference angle based on the average angel and the angle between the intermediate moving direction and the horizontal direction;
   determining a moving distance connecting the two adjacent positions corresponding to the intermediate moving direction;
   determining whether the reference angle is less than a threshold angle and whether the moving distance is larger than a threshold distance; and
   in response to a determination that the reference angle is less than the threshold angle and the moving distance is larger than the threshold distance, determining the intermediate moving direction as a candidate intermediate moving direction.

5. The system of claim 3, wherein the determining the moving direction of the candidate object based on the candidate intermediate moving directions includes:
   determining an average moving direction of the candidate intermediate moving directions as the moving direction of the candidate object.

6. The system of claim 1, wherein the determining the one or more target objects from the one or more candidate objects based the on one or more moving directions corresponding to the one or more candidate objects includes:
   for each of the one or more candidate objects,
   determining whether the moving direction is a direction away from the road or a direction crossing the road; and
   in response to a determination that the moving direction is the direction crossing the road, designating the candidate object as a target object.

7. The system of claim 1, wherein the determining whether the vehicle has a traffic violation behavior associated with the one or more target objects based on the one or more second images includes:
   determining whether the one or more second images are captured within a first predetermined time period; and
   in response to a determination that the one or more second images are captured within the first predetermined time period, determining that the vehicle has a traffic violation behavior associated with the one or more target objects.

8. The system of claim 7, wherein
   the one or more predetermined positions include a first line within a first predetermined distance range of a side of a crosswalk area, a second line within the crosswalk area, and a third line within a third predetermined distance range of the other side of the crosswalk area, and
   the one or more second images include three images of the vehicle captured at the first line, the second line, and the third line, respectively.

9. The system of claim 1, wherein the determining whether the vehicle has a traffic violation behavior associated with the one or more target objects based on the one or more second images includes:

determining whether a door of the vehicle is open and whether at least one of the one or more target objects disappears in a second predetermined time period based on the one or more second images; and in response to a determination that the door of the vehicle is open and the at least one of the one or more target objects disappears, determining that the vehicle does not have a traffic violation behavior associated with the one or more target objects.

10. The system of claim 1, wherein the at least one processor is configured to cause the system to perform the operations further including:

in response to a determination that the vehicle has a traffic violation behavior associated with the one or more target objects, detecting at least one of a license plate, a speed, a face, or a driving behavior associated with the vehicle.

11. The system of claim 1, wherein the at least one processor is configured to cause the system to perform the operations further including:

causing a signal device to generate a reminder signal in response to determining the one or more target objects.

12. A method implemented on a computing device including at least one processor and at least one storage medium, and a communication platform connected to a network, the method comprising:

identifying one or more candidate objects within a predetermined region associated with a crosswalk at a road from one or more first images of the crosswalk captured by a surveillance equipment mounted near the crosswalk;

for each of the one or more candidate objects, determining a moving direction of the candidate object with respect to the road;

determining one or more target objects from the one or more candidate objects based on one or more moving directions corresponding to the one or more candidate objects;

identifying one or more vehicles within a predetermined range of the crosswalk; and for each of the one or more vehicles, obtaining, from the surveillance equipment mounted near the crosswalk, one or more second images including the vehicle at one or more predetermined positions; and determining whether the vehicle has a traffic violation behavior associated with the one or more target objects based on the one or more second images.

13. The method of claim 12, wherein for each of the one or more candidate objects, the determining the moving direction of the candidate object with respect to the road includes:

determining an initial position of the candidate object within the predetermined region based on an initial image captured at an initial time point;

determining whether the initial position of the candidate object is in the vicinity of an outer edge of the predetermined region;

in response to a determination that the initial position is in the vicinity of the outer edge of the predetermined region, determining a plurality of intermediate positions of the candidate object within the predetermined region based on a plurality of sequential images associated with the candidate object, the plurality of sequential images being sequentially captured at a plurality of intermediate time points immediately after the initial time point;

determining a plurality of intermediate moving directions of the candidate object based on a plurality of positions including the initial position and the plurality of intermediate positions, wherein each of the plurality of intermediate moving directions corresponds to two adjacent positions of the plurality of positions; and determining the moving direction of the candidate object based at least in part on the plurality of intermediate moving directions.

14. The method of claim 13, wherein the determining the moving direction of the candidate object based at least in part on the plurality of intermediate moving directions includes:

selecting candidate intermediate moving directions satisfying a predetermined condition from the plurality of intermediate moving directions; and determining the moving direction of the candidate object based on the candidate intermediate moving directions.

15. The method of claim 14, wherein the selecting the candidate intermediate moving directions satisfying the predetermined condition from the plurality of intermediate moving directions includes:

identifying one or more lane lines associated with the crosswalk;

determining an average angle between the one or more lane lines and a horizontal direction;

for each of the plurality of intermediate moving positions, determining an angle between the intermediate moving direction and the horizontal direction;

determining a reference angle based on the average angel and the angle between the intermediate moving direction and the horizontal direction;

determining a moving distance connecting the two adjacent positions corresponding to the intermediate moving direction;

determining whether the reference angle is less than a threshold angle and whether the moving distance is larger than a threshold distance; and in response to a determination that the reference angle is less than the threshold angle and the moving distance is larger than the threshold distance, determining the intermediate moving direction as a candidate intermediate moving direction.

16. The method of claim 14, wherein the determining the moving direction of the candidate object based on the candidate intermediate moving directions includes:

determining an average moving direction of the candidate intermediate moving directions as the moving direction of the candidate object.

17. The method of any of claim 12, wherein the determining the one or more target objects from the one or more candidate objects based the on one or more moving directions corresponding to the one or more candidate objects includes:

for each of the one or more candidate objects, determining whether the moving direction is a direction away from the road or a direction crossing the road; and in response to a determination that the moving direction is the direction crossing the road, designating the candidate object as a target object.

18. The method of claim 12, wherein the determining whether the vehicle has a traffic violation behavior associated with the one or more target objects based on the one or more second images includes:

determining whether the one or more second images are captured within a first predetermined time period; and in response to a determination that the one or more second images are captured within the first predetermined time period, determining that the vehicle has a traffic violation behavior associated with the one or more target objects.

19. The method of claim 18, wherein the one or more predetermined positions include a first line within a first predetermined distance range of a side of a crosswalk area, a second line within the crosswalk area, and a third line within a third predetermined distance range of the other side of the crosswalk area, and the one or more second images include three images of the vehicle captured at the first line, the second line, and the third line, respectively.

20. A non-transitory computer readable medium, comprising executable instructions that, when executed by at least one processor, direct the at least one processor to perform a method, the method comprising:

identifying one or more candidate objects within a predetermined region associated with a crosswalk at a road from one or more first images of the crosswalk captured by a surveillance equipment mounted near the crosswalk;

for each of the one or more candidate objects, determining a moving direction of the candidate object with respect to the road;

determining one or more target objects from the one or more candidate objects based on one or more moving directions corresponding to the one or more candidate objects;

identifying one or more vehicles within a predetermined range of the crosswalk; and for each of the one or more vehicles, obtaining, from the surveillance equipment mounted near the crosswalk, one or more second images including the vehicle at one or more predetermined positions; and determining whether the vehicle has a traffic violation behavior associated with the one or more target objects based on the one or more second images.

\* \* \* \* \*